United States Patent
Horsfall et al.

(10) Patent No.: US 7,269,793 B2
(45) Date of Patent: Sep. 11, 2007

(54) CONVERSATIONAL DEALING SYSTEM

(75) Inventors: Peter Richard P. Horsfall, Morristown, NJ (US); Neena Jain, South Plainfield, NJ (US); Edward R. Howorka, Morris Plains, NJ (US)

(73) Assignee: EBS Group Limited, London (GB)

( * ) Notice: Subject to any disclaimer, the term of this patent is extended or adjusted under 35 U.S.C. 154(b) by 677 days.

(21) Appl. No.: 10/272,981

(22) Filed: Oct. 18, 2002

(65) Prior Publication Data

US 2003/0093363 A1    May 15, 2003

Related U.S. Application Data

(60) Provisional application No. 60/337,591, filed on Oct. 19, 2001.

(51) Int. Cl.
*G06F 17/11* (2006.01)
*G06F 3/00* (2006.01)

(52) U.S. Cl. ............... 715/751; 715/758; 715/755; 715/752

(58) Field of Classification Search ........ 715/748–759, 715/773; 709/204, 205, 230, 227; 370/276, 370/277
See application file for complete search history.

(56) References Cited

U.S. PATENT DOCUMENTS

| | | | | |
|---|---|---|---|---|
| 5,121,382 A * | 6/1992 | Yang et al. | ............... | 370/250 |
| 5,195,031 A * | 3/1993 | Ordish | ............... | 705/37 |
| 5,793,301 A * | 8/1998 | Patterson et al. | ............... | 340/7.23 |
| 5,905,863 A | 5/1999 | Knowles et al. | | |
| 6,052,709 A | 4/2000 | Paul | | |
| 6,347,307 B1 * | 2/2002 | Sandhu et al. | ............... | 705/36 R |
| 6,442,592 B1 * | 8/2002 | Alumbaugh et al. | ............... | 709/206 |
| 6,449,646 B1 * | 9/2002 | Sikora et al. | ............... | 709/226 |
| 6,484,197 B1 * | 11/2002 | Donohue | ............... | 709/206 |
| 6,513,019 B2 * | 1/2003 | Lewis | ............... | 705/35 |
| 6,768,981 B2 * | 7/2004 | Patterson et al. | ............... | 705/36 R |
| 6,999,469 B1 * | 2/2006 | Chu et al. | ............... | 370/466 |
| 2002/0013711 A1 * | 1/2002 | Ahuja et al. | ............... | 705/1 |
| 2002/0156693 A1 * | 10/2002 | Stewart et al. | ............... | 705/26 |
| 2003/0014395 A1 * | 1/2003 | Ruvolo et al. | ............... | 707/3 |
| 2003/0040955 A1 * | 2/2003 | Anaya et al. | ............... | 705/10 |
| 2003/0046035 A1 * | 3/2003 | Anaya et al. | ............... | 702/188 |
| 2003/0097327 A1 * | 5/2003 | Anaya et al. | ............... | 705/37 |
| 2003/0115122 A1 * | 6/2003 | Slater et al. | ............... | 705/35 |
| 2003/0195811 A1 * | 10/2003 | Hayes et al. | ............... | 705/26 |
| 2005/0165658 A1 * | 7/2005 | Hayes et al. | ............... | 705/26 |

FOREIGN PATENT DOCUMENTS

WO    WO 01/33462 A1    5/2001

* cited by examiner

*Primary Examiner*—Tadesse Hailu
(74) *Attorney, Agent, or Firm*—Dickstein Shapiro LLP

(57) ABSTRACT

In a duplex chat conversational trading system, trader terminals monitor for new incoming messages from the time a trader starts to input a new message to the time it is sent. If an incoming message is detected, sending of the message is inhibited and the trader is alerted to the new incoming message whereupon he can confirm his message, modify it or resend it. Messages are exchanged via a chat server which assigns a unique reference number to each message. Where a message received at the server is sent in reply to an earlier message it carries the reference of the earlier message. The server compares this reference to the most recent reference it has logged and notifies the parties of a crossover if the references are not the same.

48 Claims, 25 Drawing Sheets

| STATUS | TIME | TRADER/BANK | INSTRUMENT | DEAL |
|---|---|---|---|---|
| CONTACTING | 13:35:23 | peter@ CITQ | SPOT | I REQUEST 2.5 mil USD.cad |
|  | 13:36:12 | peter@ CITQ | SPOT | CAN I QUOTE 5 mil EUR.usd |
| I BOUGHT | 13:38:55 | jc@ CHMN | FORWARD | I BOUGHT 100 mil USD jpy 3m OVER AUG 25.00 @ 54.5 |
| NOTHING DONE | 13:39:01 | jm@ UBSN | FORWARD | NOTHING DONE ON MY 83.88 FOR 180.33 mil EUR.usd 17d OVER AUG 25.00 |
|  | 13:39:00 | phi@ CITQ | FORWARD | Cpty QUOTED 14.50-15.25 FOR 3.000 JPY USD.jpy 3m/6m OVER 28 Nov 00 |
|  | 13:37:43 | peter@ CITQ | SPOT | AMOUNT  CCY Par. Val date:  BID:  OFFER:  DEAL: |
|  |  |  |  | 3,200 JPY  usd.JPY 31 AUG 2000  105.91  105—  |

| PICKUP | CHAT | HOLD | FORWARD |   | BELL | RFQ | CALLOUT | BUY |   | NOTHING | CLEAR ALL | OFF | ALL |

LOGOUT  ABOUT  CHAT

ERROR!

1. # wim @ ABNA

| TIME | FROM | 𝕌 | * | MESSAGE |
|---|---|---|---|---|
| 12:27:49 | wim @ ABNA | | | CONVERSATION STARTED BY wim @ ABNA |
| 12:27:51 | wim @ ABNA | | | PICKUP PLEASE |
| 12:27:56 | chris @ GFSX | | | CONVERSATION PICKED UP BY chris @ GSFX |
| 12:28:11 | chris @ GFSX | | | WHATS UP |
| 12:28:15 | wim @ ABNA | | | ANYTHING WE CAN WATCH FOR YOU TODAY? — 802 |

CAN — 800

| SEND | ATTACH | OPEN | TRANSFER | BELL | RFQ | INVITE | FLOAT |

ERROR!

1. # wim @ ABNA

| TIME | FROM | 🔗 | * | MESSAGE |
|---|---|---|---|---|
| 12:27:49 | wim @ ABNA | | | CONVERSATION STARTED BY wim @ ABNA |
| 12:27:51 | wim @ ABNA | | | PICKUP PLEASE |
| 12:27:56 | chris @ GFSX | | | CONVERSATION PICKED UP BY chris @ GSFX |
| 12:28:11 | chris @ GFSX | | | WHATS UP |
| 12:28:15 | wim @ ABNA | | | ANYTHING WE CAN WATCH FOR YOU TODAY? |
| 12:28:20 | wim @ ABNA | | | DOING ANYTHING AFTER WORK? |

CAN I CALL YOU LATER

| SEND | ATTACH | OPEN | | TRANSFER | BELL | RFQ | INVITE | FLOAT |

FIG.17

ERROR!

1. # wim @ ABNA

| TIME | FROM | 📎 | * | MESSAGE |
|------|------|---|---|---------|
| 12:27:49 | wim @ ABNA | | | CONVERSATION STARTED BY wim @ ABNA |
| 12:27:51 | wim @ ABNA | | | PICKUP PLEASE |
| 12:27:56 | chris @ GFSX | | | CONVERSATION PICKED UP BY chris @ GSFX |
| 12:28:11 | chris @ GFSX | | | WHATS UP |
| 12:28:15 | wim @ ABNA | | | ANYTHING WE CAN WATCH FOR YOU TODAY? |
| 12:28:20 | wim @ ABNA | | | DOING ANYTHING AFTER WORK? |
| 12:27:23 | chris @ GFSX | | | CAN I CALL YOU LATER |

— 804
— 806
— 700

| SEND | ATTACH | OPEN | | TRANSFER | BELL | RFQ | INVITE | FLOAT |

FIG. 18

ERROR!

1. #wim@ABNA

| TIME | FROM | MESSAGE |
|------|------|---------|
| 14:40:26 | chris@GFSX | HI wim CAN YOU GIVE ME A RUN FOR fwd gbp pls |
| 14:40:29 | wim@ABNA | SURE |
| 14:40:31 | wim@ABNA | t/n .48 .51 |
| 14:40:32 | wim@ABNA | s/n .73 .77 |
| 14:40:34 | wim@ABNA | 1wk 1.65 1.75 |
| 14:40:36 | wim@ABNA | 2wk 3.35 3.55 |
| 14:40:38 | wim@ABNA | 3wk 5.95 5.45 |
| 14:40:40 | wim@ABNA | 1mo 8.8 9.1 |
| 14:40:42 | wim@ABNA | 2mo 8.7 19.1 |
| 14:40:42 | chris@GFSX | *STOP |
| 14:40:44 | wim@ABNA | *3mo 28.7 29.1 |
| 14:40:46 | wim@ABNA | 6mo 50.5 51.5 |
| 14:40:48 | wim@ABNA | 9mo 70 73 |
| 14:40:50 | wim@ABNA | 1yr 90 93 |

SEND | ATTACH | OPEN | TRANSFER | BELL | RFQ | INVITE | FLOAT

FIG.19

ERROR!

1. #wim @ ABNA

| TIME | FROM | @ | * | MESSAGE |
|------|------|---|---|---------|
| 14:40:26 | chris @GFSX | | | HI wim CAN YOU GIVE ME A RUN FOR fwd gbp pls |
| 14:40:29 | wim @ABNA | | | SURE |
| 14:40:31 | wim @ABNA | | | t/n .48 .51 |
| 14:40:32 | wim @ABNA | | | s/n .73 .77 |
| 14:40:34 | wim @ABNA | | | 1wk 1.65 1.75 |
| 14:40:36 | wim @ABNA | | | 2wk 3.35 3.55 |
| 14:40:38 | wim @ABNA | | | 3wk 5.95 5.45 |
| 14:40:40 | wim @ABNA | | | 1mo 8.8 9.1 — 812 |
| 14:40:42 | wim @ABNA | | | 2mo 18.7 19.1 — 814 |
| 14:40:42 | chris @GFSX | | | *STOP |
| 14:40:44 | wim @ABNA | | | *3mo 28.7 29.1 |
| 14:40:46 | wim @ABNA | | | 6mo 50.5 51.5 |
| 14:40:48 | wim @ABNA | | | 9mo 70 73 |
| 14:40:50 | wim @ABNA | | | 1yr 90 93 |

816

SEND | ATTACH | OPEN | TRANSFER | BELL | RFQ | INVITE | FLOAT

FIG. 20

CONVERSATIONAL DEALING SYSTEM

CROSS REFERENCE TO RELATED APPLICATIONS

This application claims priority to provisional application No. 60/337,591 filed Oct. 19, 2001—the entirety of which is hereby incorporated by reference.

BACKGROUND OF THE INVENTION

This invention relates to computer messaging systems which exchange messages between users. It is particularly concerned with conversational trading systems for trading fungibles such as financial instruments.

Conversational dealing systems allow the parties involved to exchange messages across a computer network. These messages may be simple chat or may include trade related information. Typically, the dealing system analyzes the messages to pick up deal related information. Deals are agreed between the parties in an exchange of messages and completed deals are detected from the message text by the system and logged.

Conversational systems may allow simplex or duplex chat. Duplex chat allows all parties involved in the conversation to have equal and simultaneous control of the conversation. Simplex chat only allows one person to have control of the conversation at any time.

Typically, in a duplex system messages passed between trader work stations pass through a chat server which logs the messages in the order in which they are received at the workstation. The purpose of this is to guarantee that both parties to the conversation see the same messages on their screen in the order in which the messages are captured in the log.

When the chat server receives a message from any trader, and passes that message onto the intended destination trader, it sends an acknowledgment to the sending trader workstation.

This duplex chat model with a chat server logging messages in order of receipt is highly advantageous and offers a number of advantages over competing systems. However, a particular problem can arise which relates to the timing of messages sent from various parties on the system. As a duplex chat system allows all parties to type and send their messages from their workstations at the same time, the possibility arises that a reply message will be sent from a second workstation in response to a message from a first workstation at about the same time as a further message is sent from the first workstation. When the reply message arrives at the first workstation it appears to the first workstation as if is a reply to the second, not the first message. This problem, which is a technical problem caused partly by the nature of the duplex chat system and partly by the timing of messages sent between workstations via at least one server, can have potentially catastrophic consequences.

Consider the following example of a conversation over a duplex chat system between two traders. Trader A sends "how are you?" to Trader B. Trader B reads the message and starts to type "ok" in response. Before he has sent this message, Trader A, without waiting for a reply to his original message, sends "You buy 100M USD@1.86". This is an offer to Trader B to buy $100 million at an exchange rate of 1.86. Before this message is received at Trader B, that trader sends the "ok" message in reply to the previous message from Trader A. Both Trader A and Trader B see on their screen the following sequence of messages: "How are you?; You buy 100M USD@1.86.; OK." The chat server, which handles the exchange of messages also logs the message in that sequence, the sequence at which they were received at the server.

Thus, in the above sequence, the system, and Trader A, think that Trader B has agreed to the proposed trade where, in fact, he has merely commented to Trader A on his well being. Clearly, a trader can take advantage in this flaw in the duplex chat system to act maliciously.

We have appreciated that this problem is especially dangerous as there is no mechanism available to the trader to indicate to which message he is responding and the system does not detect to which message from Trader A, Trader B is responding. There is, therefore, a need in the art for a duplex chat system which can analyze an exchange of messages and ensure that messages and replies are correctly matched.

SUMMARY OF THE INVENTION

The present invention aims to overcome the above mentioned disadvantage with prior art duplex chat systems.

In its broadest form, one aspect of the invention monitors for incoming messages as soon as a user begins to enter a new conversational message. If any messages are detected, (after the user has initiated a new conversational message) they are drawn to the user's attention before the new conversational message is sent. This ensures that the user can check that his message is appropriate in light of any subsequently received messages from the same party and to amend or cancel the new message if necessary.

In its broadest form, a second aspect of the invention assigns a reference to each message sent by any user. The references are logged at a message server. When a new message is sent in response to an earlier message, the new message will include the reference of the earlier message. The message server will compare that reference with the last logged reference. If the references are not the same the message server will indicate to one or both of the parties to the conversation that there has been a crossover.

More specifically, the invention is defined by the independent claims to which reference should be made.

A preferred embodiment of the invention provides a conversational dealing system for negotiated trading of instruments such as financial instruments by exchange of conversational messages in a duplex message environment. The trading system comprises a plurality of trader terminals which communicate, for example over the Internet via a message server. Each trader terminal has a screen which displays conversational messages. When a new conversation has been initiated, for example if a trader has accepted an incoming message, the trader terminal will detect the commencement of a new message entry sent in reply. This may comprise a keystroke from a keyboard. During this time, the terminal monitors for new incoming messages from the counterparty to the conversation. When the trader tries to send the new message, if a new incoming message has been detected, sending of the new message will be inhibited and the user will be alerted to the incoming message, for example by highlighting the new message on the display. The user may then confirm the send, amend the message and then confirm or cancel the message. In the first two cases the terminal continues to monitor for new incoming messages and will again alert the user and inhibit sending of a message if a new incoming message is detected between send attempts.

At the server, messages are logged as they are received together with a unique reference. This reference is passed back to the sending terminal in an acknowledgement message and passed on to the destination terminal with the message. When the destination terminal sends a reply, the reply will contain the reference of the message to which the reply is directed. The server compares that reference to the reference of the latest message in the log and, if the references are not identical, notifies one or both of the parties that there has been a crossover. The notification is preferably an icon which may appear on the traders' display in the lines of the conversation that are crossed over. Preferably, the icon may also indicate the context of the crossover.

The embodiments of the invention, in its various aspects, have the advantage that the problems inherent in duplex chat systems referred to above are overcome by detecting out of sequence messages and drawing them to the attention of the trader. Thus, the consequences of replying to the "wrong" message may be avoided.

BRIEF DESCRIPTION OF THE DRAWINGS

Embodiments of the invention will now be described, by way of example only, and with reference to the accompanying drawings, in which:

FIG. 3 is a view of the user interface of a trader terminal;

FIG. 4 is a similar view to FIG. 3 showing a number of conversation panels;

FIG. 6 is a further view of the deal stack and deal detail panel with a different deal highlighted in the deal detail panel from FIG. 5;

FIG. 14 shows the maker's screen when a deal has been finalized;

FIG. 15 shows a modified chat panel embodying the invention;

FIG. 17 shows the chat panel of FIG. 15 with a second attempt at sending a line of conversation;

FIG. 18 shows the chat panel when a clean send is sent;

FIG. 19 shows the chat panel highlighting a crossover;

FIG. 20 shows the crossover of FIG. 19 after a "show context" action has been invoked;

DETAILED DESCRIPTION OF THE PREFERRED EMBODIMENT

Figure 1:
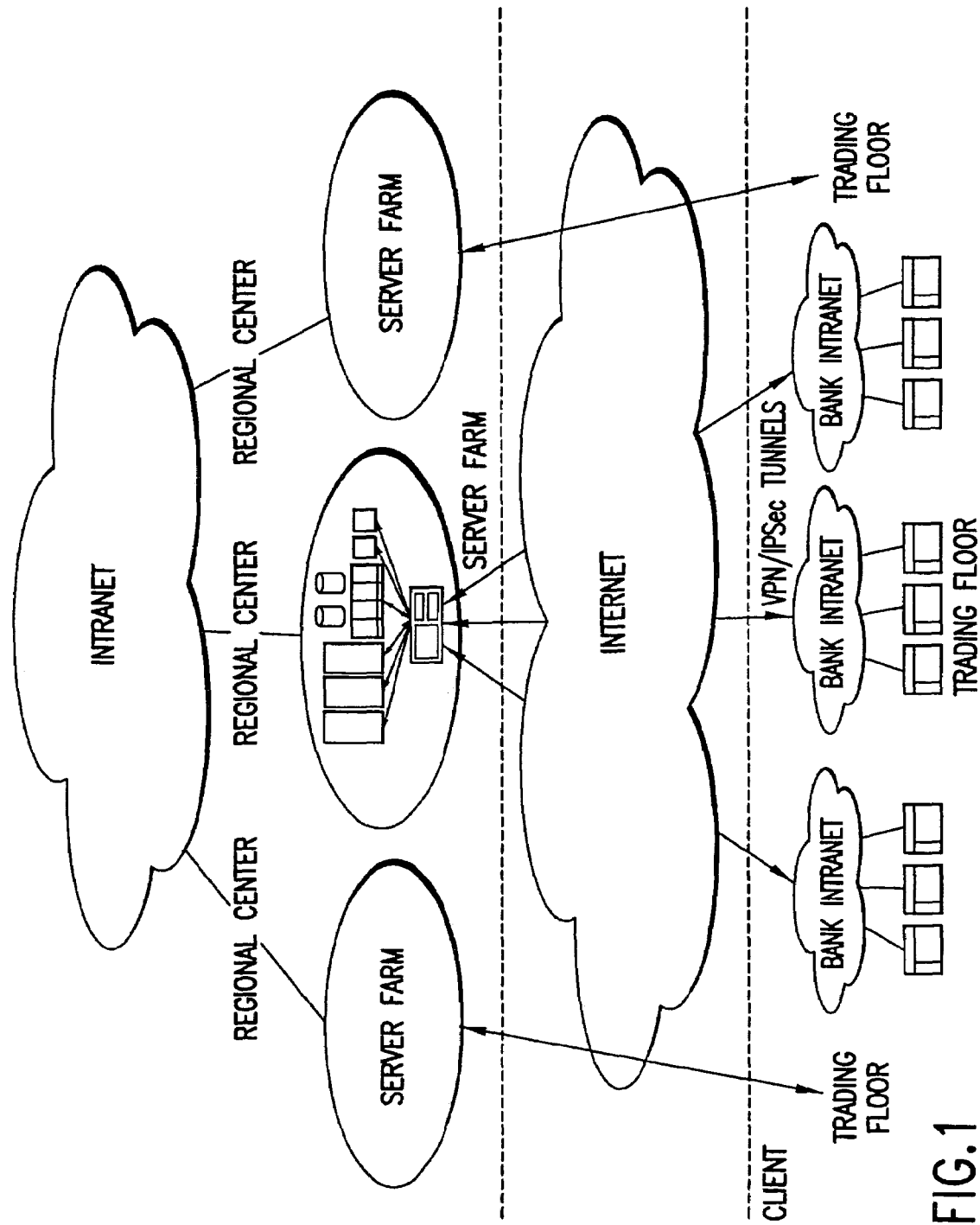
FIG. 1 is a schematic diagram of a trading system.

The embodiment of the invention provides a solution to the problem of one trader appearing to have replied to a message different from the one to which he has actually replied. There are two aspects to this problem: a race situation and a crossover situation where messages from two parties crossover each other.

Broadly, the system tracks the last message the user read before he sent his response as opposed to the last message displayed on his screen when he sent his response. This approach captures the user's intent when responding to a message. In addition, in order to keep the solution, without sacrificing the duplex nature of the chat functionality, each trader's workstation starts to keep track of all new lines of messages received as soon as the first key is hit by the trader to type his response, until the time he sends the message. Of course there are other ways in which a trader may enter a message into the system, for example using voice activated software but the principle is the same, in that the system monitors for all new messages from the beginning of the construction of a message to the time in which it is sent. Sending the message may be achieved by a number of methods, for example hitting a "send" key on a keyboard or keypad, clicking a "send" button on the workstation or using a spoken "send" command in a voice activated system.

If the workstation has detected additional incoming lines of conversation received while typing, the workstation will warn the trader and highlight the new lines received. It will then ask the trader to either proceed or type a new message. Thus, the trader can read the additional lines and change his response, based on the additional lines received from the counterparty.

If the trader presses "send" again, to continue sending the message, the workstation will send the message to the chat server along with the reference number of the last line received from the server.

No warning is sent if no additional lines were received during message construction.

The approach outlined above allows the server to detect crossovers and also to mark the message log in a manner that facilitates proper audits later on.

The following example shows how the methodology described works. It shows the exchange of messages between two traders Trader A and Trader B.

| Trader A | Trader B |
|---|---|
| Sends line 1 | |
| | receives line 1 |
| Sends line 2 | |
| | receives line 2 |
| Sends line 3 | |
| | receives line 3 |
| | Starts typing. . . |
| Sends line 4 | |
| | receives line 4 |

-continued

| Trader A | Trader B |
|---|---|
| Sends line 5 | |
| | receives line 5 |
| | Presses "send" |
| | WS highlights lines 4 & 5 |
| | and asks "want proceed?" |
| Sends line 6 | |
| | receives line 6 while warning is up. |
| | Presses "send" to send line 7. |
| | WS highlights line 6 and asks "want to proceed?". |
| | Trader starts modifying line 7, presses "send". |
| | WS checks no line received) sends line 7 and reference |
| | number of line 6 to server. |
| Receives line 7. | |

Before describing the functionality in more detail, the conversational dealing system on which it operates will first be described, with reference to FIGS. 1 to 14.

The system illustrated schematically in FIG. 1 is a conversational dealing system for trading a variety of financial instruments by exchange of messages in a duplex messaging environment. Instruments which may be traded include, but are not limited to, foreign exchange (F/X) spot, forwards, and outrights. Although the following description will concentrate on F/X spot and forwards, it is to be understood that this is purely for the purposes of illustrating the invention and that the invention is not limited to any particular financial instruments or even to financial instruments. It is equally applicable to the trading of any other fungible such as commodities, metals, etc.

The illustrative system is an Internet based system in which traders communicate with other trader from trader terminals across the Internet. Trades are agreed upon by an exchange of messages between traders. The message content is automatically parsed by the system to identify deal related content for processing. Once the parsing has detected a deal status change, the remainder of the deal processing is handled by the deal stack. Deal status change need not be entered by conversation but may be directly input from the traders terminal, for example by using on screen function buttons or keyboard driven menus. Thus, the system also allows users to deal by a simple exchange of deal content data which is non-conversational and by a mixture of the two methods.

The following description gives an overview of the trading system within which the user interface is used by traders to execute deals. However, it is to be understood that this is only one example of a trading system suitable for use with the invention. The invention is not limited to any particular trading system but applies to any duplex chat based system. Such a system may be Internet based or operate on a conventional public or private network. It may use a distributed architecture or operate using a central host or may be configured in any other manner. It is, however, a feature of any such system that chat is handled by a chat server which may be dedicated to chat handling or also perform other functions.

Referring now to FIG. 1, the trading system disclosed is based on a plurality of server farms connected through a system Intranet. The server farms communicate with trader terminals at bank trading floors through a communications network, here the Internet, and local bank Intranets. The majority of deal processing takes place at trader terminals with deal messages being passed by the server farms to counterparty trader terminals. The server farms also pass done deal information to bank back office systems to enable deal tickets to be produced and trades to be settled. The deals are input into the system either directly by the trader or through parsed conversation exchanged between traders, as will be described. Parsing takes place at the trader terminals.

Figure 2:
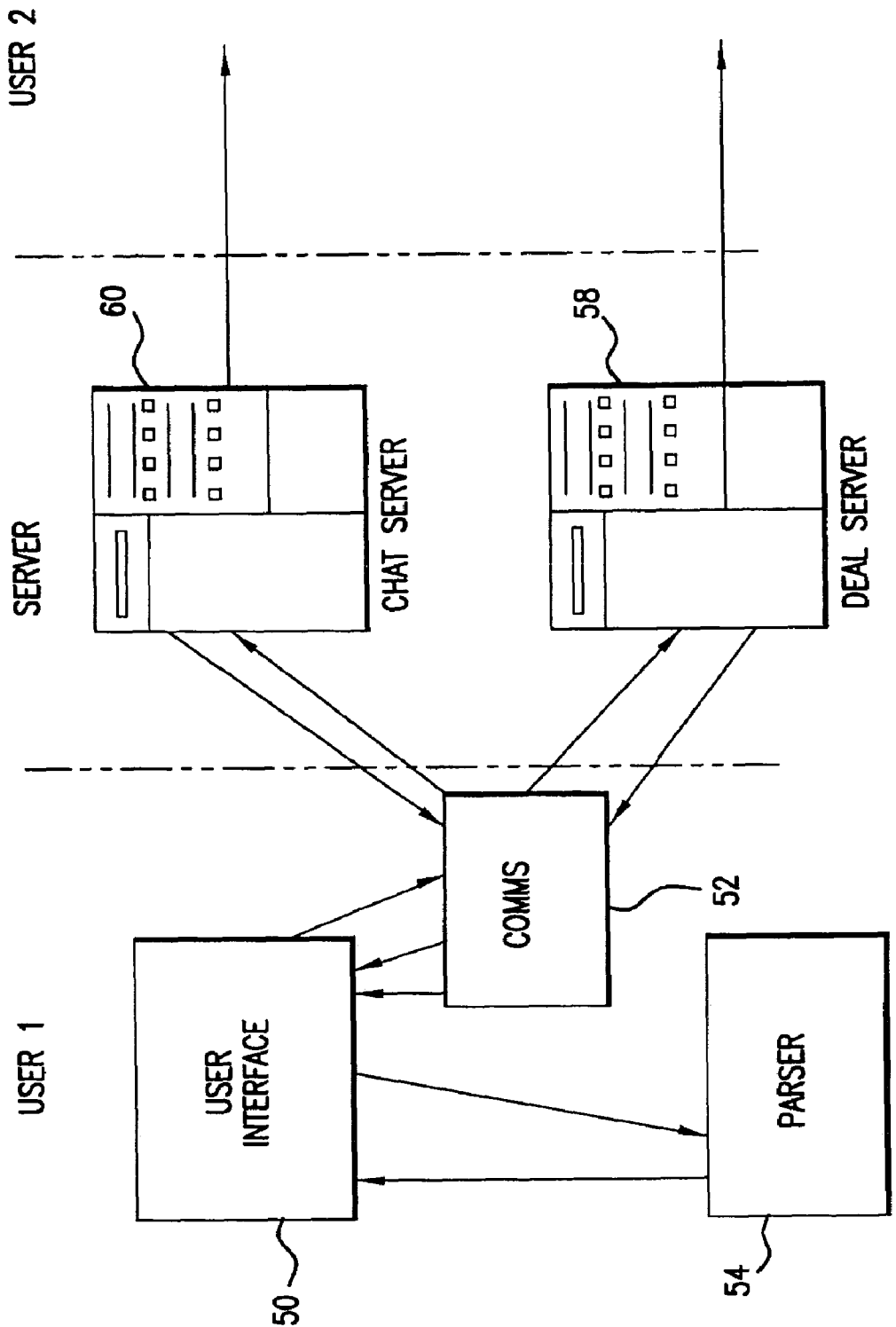
FIG. 2 is a further schematic diagram showing the main functional components of a trader terminal.

FIG. 2 shows, schematically, the system in a little more detail. A plurality of client users, two of whom are shown, communicate with each other, and with other client users not shown, by exchanging conversational messages from their terminals via a system server. Each client terminal has three logical components: a user interface 50, a communications module 52 and a parser 54. The client terminals may be any suitable computer such as a PC or workstation having conventional components such as input devices including a keyboard and a mouse, and a monitor, which presents the user interface to a trader.

The client stations, and the server communicate via a communications network which may be a private network or a public network such as the Internet, for example via the World Wide Web as shown in FIG. 1. The communications module may, for example, be a modem at the client station or client local area network, or some other suitable device.

The parser 54 performs an analysis of conversations exchanged between system clients and extracts deal related information from those conversational exchanges as will be described in detail. The functional components of the system: the parser, the user interface and the communications software are downloaded to the client terminals as an applet each time a client logs on to the system. This means that the client terminal does not have to store any software in order to access and run the system, all of which may be done by accessing a suitable site on the World Wide Web. The system may be used by a trader no matter where they are located. However, as will be seen, the system described in this example is intended to trade very large amounts of currency and currency products, as well as other fungibles, and, in practice, is restricted to banks and other institutions of proven credit worthiness. Nevertheless, the portability and flexibility of the system is advantageous to traders and is not available in prior art conversational dealing systems in which access is limited to a proprietary network.

The communications network includes a deal server 58 and a chat server 60. These form a part of the server farm of FIG. 1. The deal server acts to verify the details of proposed deals against business and banking rules and allows other checks to be made before a proposed deal is made visible to a potential counterparty. This may include the deal maker's creditworthiness; that is their ability to settle the trade they are proposing. The chat server 60 handles the exchange of conversations between clients on the network. As will be discussed, conversational messages, which may or may not contain deal related information are passed between clients via the chat server. A client can participate in several conversations at any given time and can conduct several different conversations with a particular other different client simultaneously, allowing two parties to have two or more deals under negotiation at the same time.

Figure 3:
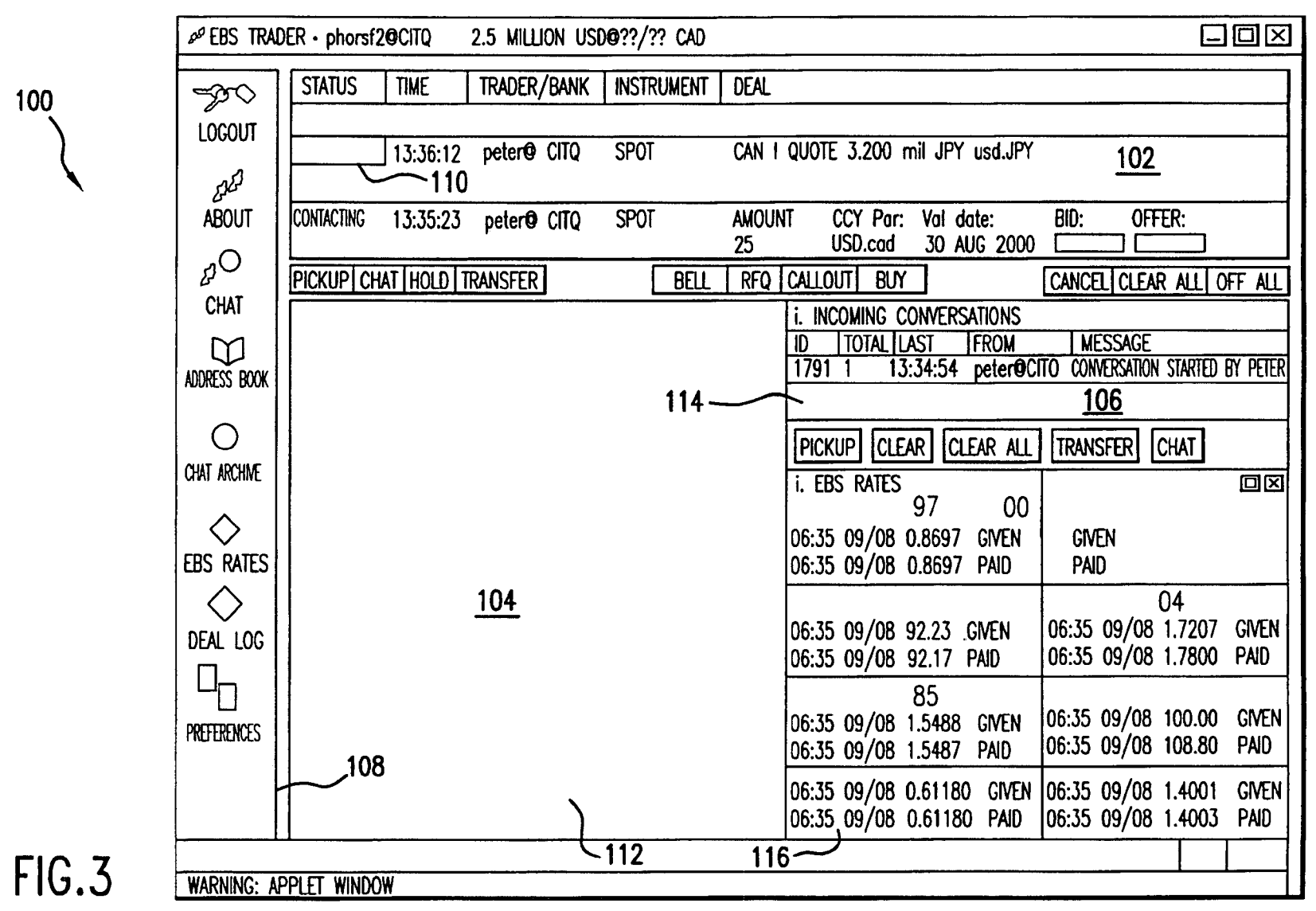

FIG. 3 shows the user interface which is displayed at each trader terminal. The display comprises a number panels. To an extent the panels displayed are configurable by each trader according to his or her preferences although some of the panels are permanent. In essence the display 100 includes three notional containers 102, 104 and 106. Container 102 is the upper of the three containers and extends across the width of the display, beneath the upper container is a lower left container 104 and a lower right container 106. To the left of the containers is a configurable icon display 108.

The upper container only displays panels which require the full width of the traders display area. Each of the panels which can be displayed is assigned one of two priorities. A panel with priority 1 may not be obscured. A panel with priority 2 may be covered or given zero height. In either circumstance the panel data model is maintained when the panel is invisible allowing the data contained to be displayed when they become visible again.

Figure 4:
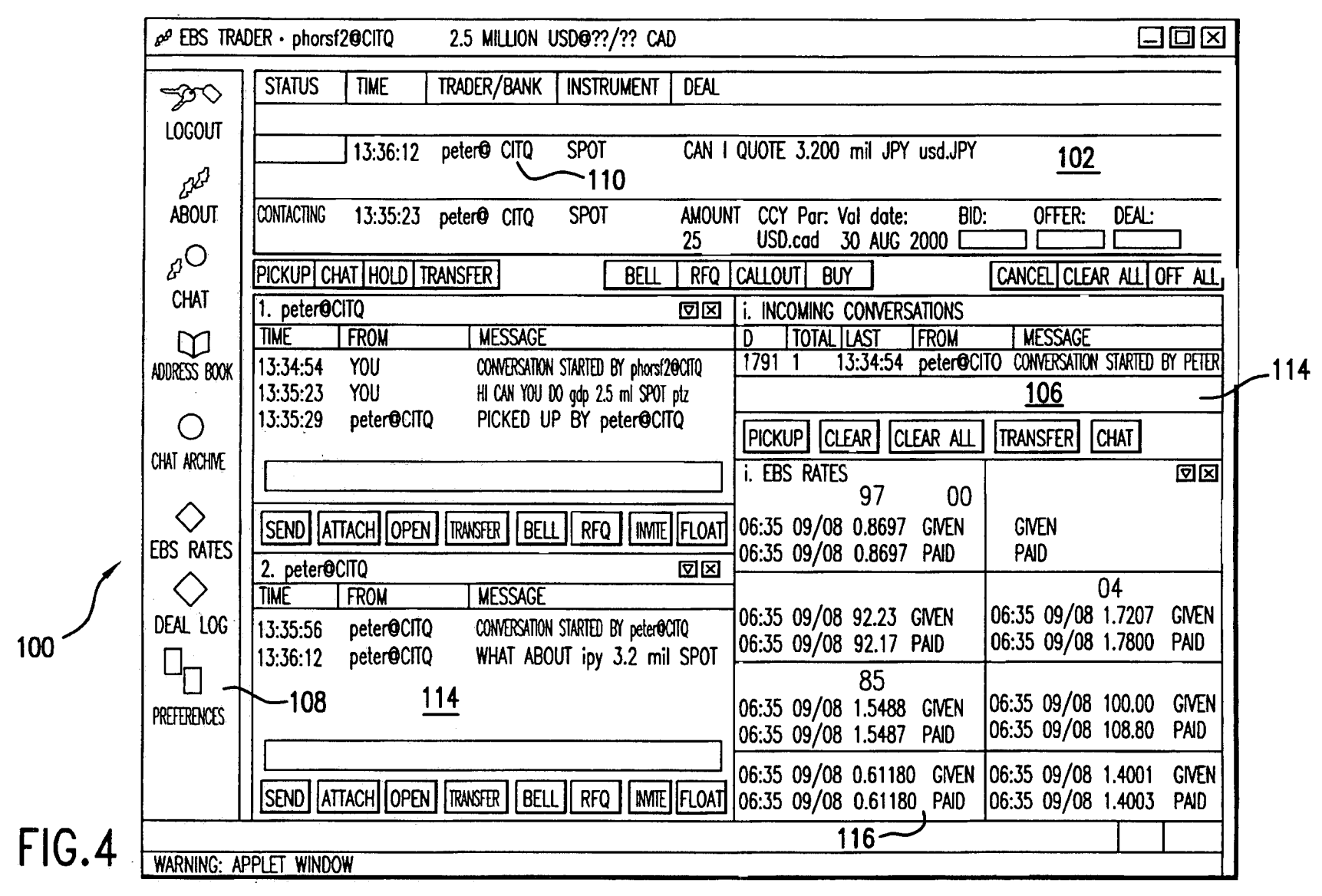

There are three permanent panels each of which have priority 1. These are shown in FIGS. 3 and 4. In the upper container 102 is displayed a deal stack 110, in the lower left container 104 is displayed a conversations area 112 containing a number of conversations in which the trader is participating, and in the lower right container is displayed an incoming conversations panel 114 in which incoming conversational messages are displayed. The incoming messages include conversations in which the trader is not yet participating, and may never, participate.

The optional panels which the trader may choose to display includes:

A Trader Deal panel (not shown), assigned a priority 1 and showing all the deals done by the trader and which may be displayed in either of the two lower containers;

An Overview panel (not shown), assigned a priority 1 and positioned in either of the two lower containers;

A Deal Log panel (not shown) having a priority 2 and showing deals logged by the system and displayed in the upper container 102;

A Rates Area 116 which displays the current trading rates on the system for various currency pairs and which is assigned a priority 2; and A Conversation Archive (not shown) positioned in one of the lower containers and which has a priority 2.

As can be seen from FIG. 4, some of the panels include a button bar along their lower edge. The various functions of the buttons will be discussed in due course. The conversation panel's button bar include a float button. Clicking on this button enables the position of the panel to be varied around the screen, even outside the window in which the entire system is displayed. This may be useful, for example, when the client wants to display several optional panels or there are a larger number of conversations open. In the embodiment described up to ten conversations may be ongoing at one time, although it will be appreciated that this is an arbitrary number which may be varied.

The incoming conversations panel lists only incoming conversational messages. In the example of FIG. 3, there is a single conversation displayed. At this time, the client is not a party to the conversation. The conversation is displayed under four headings: ID, which is the unique conversation identity number; Time, which is the time at which the conversation was initiated by the counterparty; From, which is the identity of the counterparty initiating the conversation; and Message which is the latest message line in the conversation. In the FIG. 3 example, the message, a Conversation started by peter@CITQ', has been sent by a trader identified as Peter at the institution having the identifier CITQ. The conversation was initiated at 13.34.54 and has the ID No. 1791. Each new conversation is identified with an ID No. It is also associated with a DealInfo file which is a set of deal related information including the deal type: Spot FX, FX Outrights, Forwards etc.; the deal amount, the deal direction (maker, taker) and other necessary information. The DealInfo file also includes the current status of the deal.

Central to the manner in which conversations are parsed is the concept of a deal being in one of a number of states indicating how far the deal has progressed. In essence, these states begin with No State, which relates to conversation with no deal related information; RFQ which is the state in which a Request For a Quote has been identified by the parser; Quote, in which a quote has been identified by the parser in response to the RFQ; and Buy/Sell in which the deal is completed by one party agreeing to buy or sell at the price quoted.

Underneath the Incoming Conversations panel is a button bar with buttons marked 'Pick Up', 'Clear', 'Transfer' and 'Chat'. To select a conversation for action the client clicks on the conversations line, which will cause that conversation line to be displayed in a different colour from any other conversations in the panel (in the present case it is the only conversation). If the client clicks on the 'Pick Up' button, a Conversation panel is opened in the bottom left container 104 for the selected conversation. At this point the system causes all other parties to whom the conversational message has been sent to display the message 'username has joined the conversation'. When a party joins a conversation they see that conversation only from the point at which they joined it. Once a first person has picked up an invitation to chat to a deal code, that invitation will be withdrawn from all other parties to which the invitation was sent.

Once a trader picks up a conversation, the conversation is removed from his Incoming Conversations panel.

The 'Clear' button, when clicked, causes the selected conversation to be cleared from the display. When a conversation is cleared, the conversation initiator will receive a 'Conversation declined by username' in their own Conversations panel.

The 'Transfer' button is only enabled if a conversation is bilateral. If clicked, the conversation will be transferred to the trader or Deal Code specified in the Transfer Conversation dialog. Rules may be established defining to whom, if anyone, a given trader may transfer a conversation.

The 'Chat' button invokes the launching of a conversation session and also opens a conversation panel in the conversation area. Multiple conversations may be opened with the same person, although a warning box will be displayed to notify the client if he is attempting to open a second or subsequent conversation with the same person.

All the functionality of the button bar may be displayed, alternatively, as a drop down menu to enable operation by keyboard only.

Figure 5:
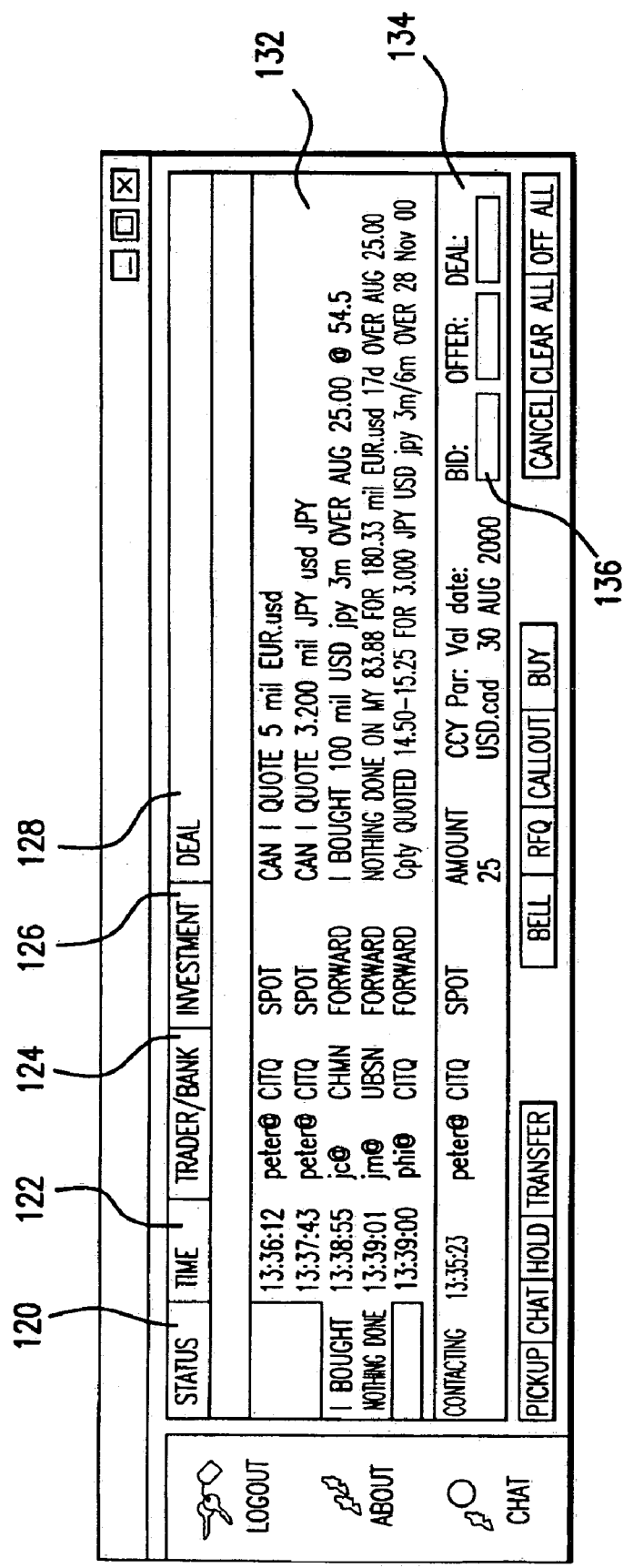
FIG. 5 is a view of a deal stack within the user interface and showing the deal detail panel.

Referring now additionally to FIGS. 5 and 6, the deal stack shows a list of deals in which the trader is involved in and which are pending or completed.

The Deal Stack 130 comprises the following major components: A Deal List 132, a Deal Detail Panel 134, and a Button Bar 136. The deal list presents information about a deal under four headings: the deal Status 120, the Time 122, the Counterparty (Trader/Bank) 124, the Instrument which is being traded 126 and the Deal 126 that is being made. The information presented in the deal list is independent of the instrument being traded. This is achieved by the use of the deal detail panel and is extremely advantageous as it allows the deal stack to be presented to the client in a very simple manner, with the minimum amount of information and in a manner which is easily assimilated by the trader.

To understand the text of the Deal field 126 it must first be appreciated how deal related information can be put into the system and how the system understands that information as relating to a deal. Deal information may be submitted to the system in one of two ways: direct deal input or parsing of conversations. Parsing of conversations will be discussed in greater detail later. At this stage it is sufficient to appreciate that parsing involves the system analyzing conversational messages to determine whether they contain any deal related content. If they do, then the deal is displayed in the deal list.

A deal is commenced by a 'Request For a Quote' (RFQ) input into the system by a trader. An RFQ is an indication by a trader that he is interested in trading. The first line of the deal list in FIG. 3 shows an RFQ. Here, the trader has put a request out to the market to trade $2.5 Million in the US$/Canadian dollar market. At this stage no bid or offer prices are given and there is no indication whether trader wishes to buy or sell. The RFQ could have been input into the system as a conversational message or by the trader making a direct input, in which case he hits the RFQ button in the deal button bar. This will display a panel asking for the instrument, the currency pair and the amount.

Thus a deal may be initiated either by the entry into the system of a direct quote request or by the detection of a quote request by the parsing of conversations. For convenience this may be referred to as an indirect quote request.

When an RFQ is received or detected, the systems determine the text that will be displayed in the deal list. This will either be a transliteration of the direct RFQ or a representation of the parsed, indirect RFQ.

A number of deal statuses are defined for each instrument. Each of these has an associated status string which is displayed in the Status field, a deal string which is the text displayed in the deal field and an understood description.

For every deal in the deal stack there is a corresponding conversation session. In some cases, the RFQ will have originated from a conversation. In others it will have not. In the latter case, a direct quote, a conversation is created but a conversation panel is only opened, that is, the conversation is exposed, if specifically requested by the trader.

Thus, whenever the system performs an action on a deal in response to a Trader action, a message line shall be included in the conversation session indicating the nature of this action. This message line shall be in a form where if the Trader had exposed the underlying conversation and typed in the message text it shall parse and produce the same action on the deal. The Message shall be in a form that reflects the best conversational practice from the point of view of parsing.

The Deal List displays all live RFQs that the trader is involved with. He may see other RFQs if the appropriate options are set. The Trader shall have the option of clearing completed deals automatically as they are completed. The Trader shall have the option of seeing all RFQs that have been auto-forwarded from his account. Auto-forwarded RFQs shall be cleared from the Deal List by the Clear function.

As mentioned above, the Deal List is wholly independent of the instrument being traded. Thus, the Deal List only displays five columns: Status, Time, Trader/Bank, Instrument, and Deal. The Deal column contains an instrument/status specific string that is generated by the system to describe the deal.

To balance the instrument independence of the deal list, the Deal Detail Panel at the bottom of the Deal List has an instrument specific format and reflects full details of the deal that is currently selected in the list.

When a new Deal is added to the Deal List it is inserted at the bottom of the list regardless of the currently selected sort order (a re-sort is necessary to position the deal correctly in the sort order). When a deal is added to the Deal List, as a result of the trader's actions (RFQ or Chat), the item last added to the table becomes the selected item. The list is scrolled so that the selected item is visible to the trader. If the new deal is initiated by a Counterparty the selected deal does not change. If focus is in the Deal List, the currently selected item does not change when a new deal is added to the list. If a new deal is added to the Deal Stack such that the Deal Stack would have to be scrolled to view the deal, then the scroll bar's background flashes, for example red, until the deal is made visible by scrolling.

The Deal Detail panel may contain buttons and other controls that relate to instrument specific functionality which is not available through the standard Deal Stack buttons. When a deal is in a modifiable state the modification is done via edit controls in the Deal Detail panel. These potentially modifiable fields have a different colour, for example, cyan, background to the rest of the deal Detail panel. The deal detail panel itself may be a different colour, for example yellow, to the deal list. When the fields are editable they are distinguished, for example by a white background with a black border.

The Format of the Deal Detail panel is specific to the instrument of the deal. Every implementation of the panel has certain common fields and controls that are always in the same place: Status, Time, Trader/Bank, Instrument & Error/Warning Combo Box. FIGS. 5 and 6 illustrate the Deal Detail panel for F/X Spot.

Thus, the Deal Detail panel includes all the information in the Deal list except that instead of the deal string it contains the information which, when entered and then parsed, will result in that deal string. Thus, for F/X Spot, the Deal Detail panel includes Amount, Currency Pair, Value Date, Bid and Offer prices and Dealt. In FIG. 5, the deal detail panel is shown for the first deal in the stack. This is a deal which has only just commenced and where the RFQ has been issued. As there are not yet any bid or offer prices, the only fields that are populated are the amount, the currency pair and the value date. When parsed this results in 'I request 2.5 Mil USD.cad'.

In FIG. 6, the deal highlighted is the third in the list and, the status of the deal is pre quote maker, indicating that the maker has picked up the taker's quote and is quoting bid and offer prices for 3,200 million Japanese Yen. As the amount and the prices can both be edited, they appear in the Deal Detail panel as black text on a white background.

Parsing within trading systems is, itself, known. Parsing is used in the Reuters Dealing 2000/1 system sold by Reuters PLC and used in the foreign exchange markets for many years. However, in that system, all deal transactions are through conversation which is performed on a simplex model. The trader does not have the option of using direct deal entry as described above. As a result there is no requirement for the system to be able to deparse deal information. Because of this, and for various other reasons, the parsing requirements of the present system differ markedly from those of the Reuters System. The following description will consider the foreign exchange markets and, in particular, the three instruments discussed above: FX Spot, FX Outrights and FX Futures. First, the manner in which the parser operates will be described by discussing how a conversational deal is executed with reference to the flow diagrams of FIGS. 7, 8a, 8b and the various shots of the user interface of FIGS. 9 to 14. It should first be noted that FIGS. 9 to 14 show a different embodiment of the User Interface from that previously described.

At all stages in the exchange of chat, the parser monitors the conversations looking for an RFQ (Request for a Quote). The presence of an RFQ alerts the parser that a new deal is being initiated. Thus if two traders are exchanging pleasantries unrelated to a deal, the parser will monitor the conversation for an RFQ. The user's parser is responsible for parsing the user's conversation but plays no part in the parsing of conversation received from the other party to a conversation.

In the following example, a new conversation has been initiated by a client referred to as Client 1 and shown in FIG. 9 as kdunay@EBSN. This user has typed a message into his Chat panel and hit the return key. This causes the User Interface to send the line of chat to the parser regardless of content. The parser parses the conversation looking for a change of status and for other deal related information. In the present case, the parser has detected an RFQ in the line of chat. That line, although not shown may have been 'I want 1 Yen'. The parser detects this as an RFQ and then looks for other deal related information which includes the instrument traded, here identified as FX Spot, the currency pair, here US Dollars/Japanese Yen, and the amount, here 1 Million. The Parser returns the parsed conversation to the User Interface in the form of the DealInfo structure referred to earlier and which contains the Deal Status and the deal related information.

Figure 9:
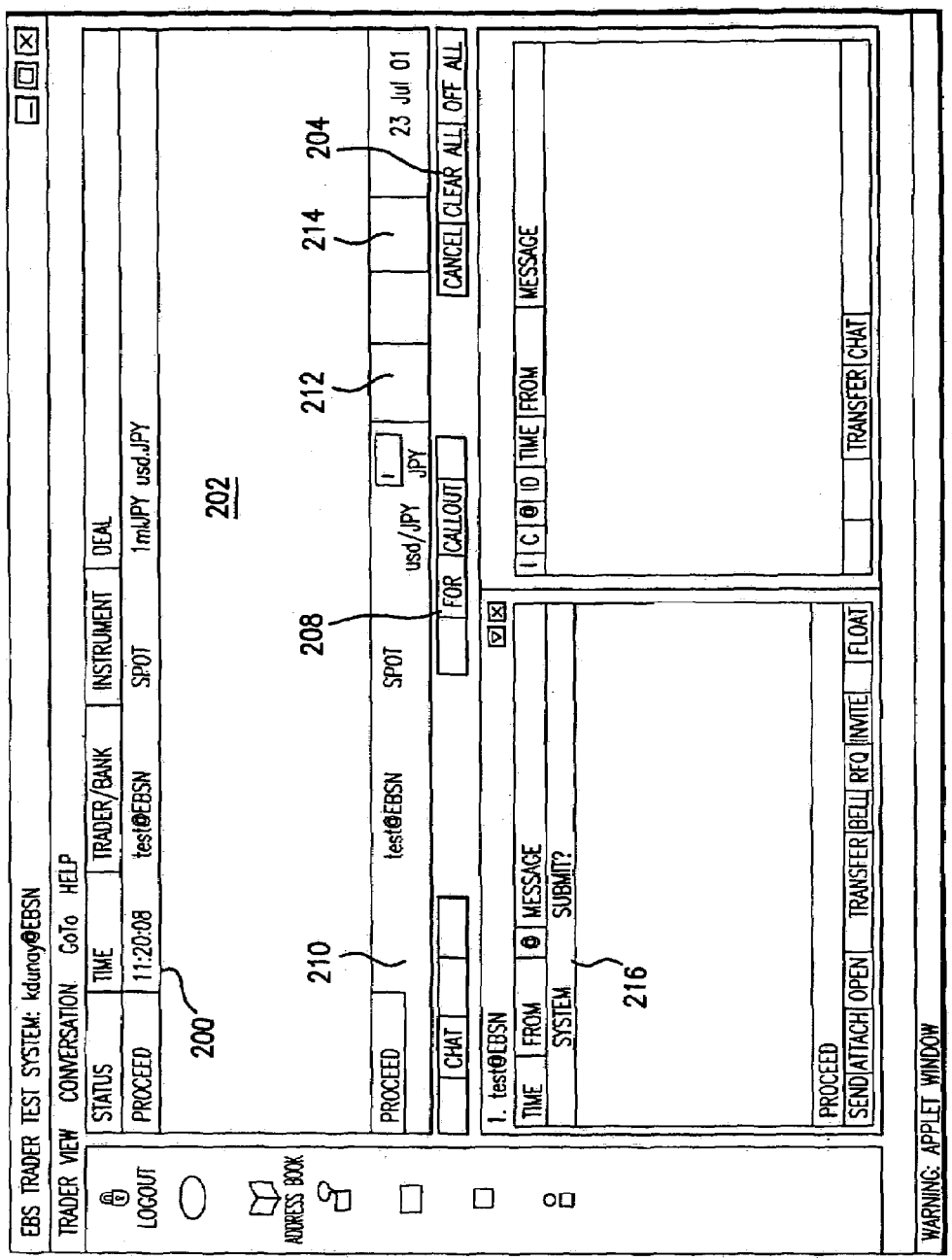
FIG. 9 is a screen shot of a second embodiment of the user interface showing a parsed message entered by the maker.

FIG. 9 shows the situation were the DealInfo structure has been returned to the User Interface. The RFQ has not yet been entered into the system and is displayed as a parsed line 200 in the deal stack 202. The parsed line can either be cancelled by the user, kdunay@EBSN, by hitting the Red Cancel button 204 or edited, for example to change the amount or the currency if the trader has made a mistake, changes his mind or is reacting to a change in the market conditions. Editing is performed by pressing the 'Fix' button 208. Alternatively, the user may re-enter the conversation so that it is reparsed. To indicate to the user that action is required, the Status of the line in the deal stack is shown in a representative colour, for example green. The button 206 on the button bar that the user has to press for the RFQ to be sent is also shown in Green. The parsed conversation is shown in the deal stack in a representative colour, for example red, to show that it is system generated text. At this point, a system message 'Submit?' is also displayed, in red, in the conversation panel.

It will be seen that the deal stack of FIG. 9 differs from that of the earlier example in that it includes a strip 210 above the button bar which displays to the user, significant information about a highlighted deal. Thus the strip includes the deal status, the trader, the instrument (spot), the currency pair, the amount with the base currency indicated and the buy and sell rates. These latter rates are displayed in boxes 212, 214 which are unfilled in FIG. 15 as no rate has yet been quoted in this deal.

In the example, the line of conversation parsed resulted in a detected deal status. The line of text could simply have said something like 'Hi, how are you'. The parser would not have detected any deal related information but it would still send a response to the User Interface to indicate that a line of conversation had been parsed, but no dealing information had been found.

When the user is satisfied with the parsed line as it appears in the deal stack, he presses the 'Proceed' button 206. This causes the parsed conversation to be sent to the client's communications module 54 (FIG. 2) and then to the deal server 58.

At this point there are a number of features of the parsing which should be emphasized. First, the parser parses the conversation line by line. Parsing does not take place until the user has finished typing and hit the send button 216. This contrasts with the system used in the Reuters 2000/1 system referred to earlier which parses conversations as they are being typed by the user. The system described here is advantageous in that the user can change what he has typed, for example to react to changes in the market, or simple to correct errors, without disclosing his hand to the counterparty trader. Giving the counterparty trader knowledge about a view of the market is highly undesirable as it may affect the bid or offer he makes.

Second, the parser plays no part in the deal making process and retains no knowledge of the deal. The parser merely looks at the line of conversation for information relating to the deal status. It returns the DealInfo structure to the User Interface and does not retain any knowledge of the deal. This makes the parser very simple.

Third, the parsing is based on a deal status structure with the emphasis on detecting status movements. The deal status are very simple: None, RFQ, Quote, Buy/Sell although these are elaborated as will be discussed. In each of the statuses, there are a number of deal related terms that the parser looks out for. This makes parsing very simple and accurate. Firstly because there are not many terms to look for and secondly because there is less chance of confusion arising resulting in misparsing. This could occur, for example, if a line of conversation referred to a historical deal between the parties. By separating the deal process into a number of statuses each of which have a limited number or parseable terms, it is relatively easy for the parser to avoid such misparsings. The details of the statuses and deal related terms for each status will be discussed in detail later.

In the example given, the conversation parsed by the parser contains both a change in deal status and all the information that is required to accompany that detected status (instrument, currency pair, etc.). For each of the possible deal statuses there are only a number of permitted transitions and for each deal status there is a limited number of expressions that the parser will recognize as indicating a change in status. For example, if the new conversation includes a request for a quote, the parser will look for information which indicates a quote. It will parse the entire line and, for a given status will look to fill a predetermined number of information fields. These will vary depending on the status. As an example, when the parser is expecting a change in status from RFQ to Quote, it will look to see whether there is an indication of a bid quote and/or an offer quote, or a refusal to quote. If there is a bid/offer quote it also looks for an indication of the currency, in the case of an FX spot trade. The states of the deals and the fields required will vary depending on the instrument being traded.

Once the conversation input from the user has been parsed, the parser returns to the user interface one of three possibilities:

a) there is nothing in the conversation that is parseable. This will be the case is the conversation does not include any deal related information;

b) an update in the deal structure which includes the new deal status and the fields found;

c) an error message where there is an ambiguity and it cannot resolve the status change. In this case, the error is displayed in the chat stack and the deal is not changed.

Reverting back to the parsed conversation message. From the client's communications module 54 the message is sent to the deal server at which point it is checked to ensure that it conforms with system regulations, banking regulation and business related rules. It may also enable credit checks to be made, for example by linking in the deal details to the user bank's global credit checking mechanisms. If the deal cannot proceed a failure message is displayed at the user terminal but the counterparty is not made aware of that fact. As far as the counterparty is concerned, the RFQ that he put out is simply not answered. This ability to conceal failed deals is advantageous as a user will often not want a counterparty to know that he has tried to deal with him but failed. He will also not want that counterparty to know the details of the attempted deal as it will disclose to him valuable information about his intentions and his reading of the market. This advantage stems from the manner in which the systems parses conversations on a line by line basis rather than in real time as they are typed in character by character.

Assuming that the deal server 58 does not reject the RFQ, the parsed message is sent to the destination User Interface via the destination client's communication module. It should be noted that the system is arranged such that the deal server handles all deal related parsed traffic and the conversation or chat server handles all conversations carrying unparsed conversation; that is conversations which the parser has not found to contain a change in deal status. This dual server arrangement is convenient but is not essential and could be replaced by a single server or some other server configuration.

Figure 10:
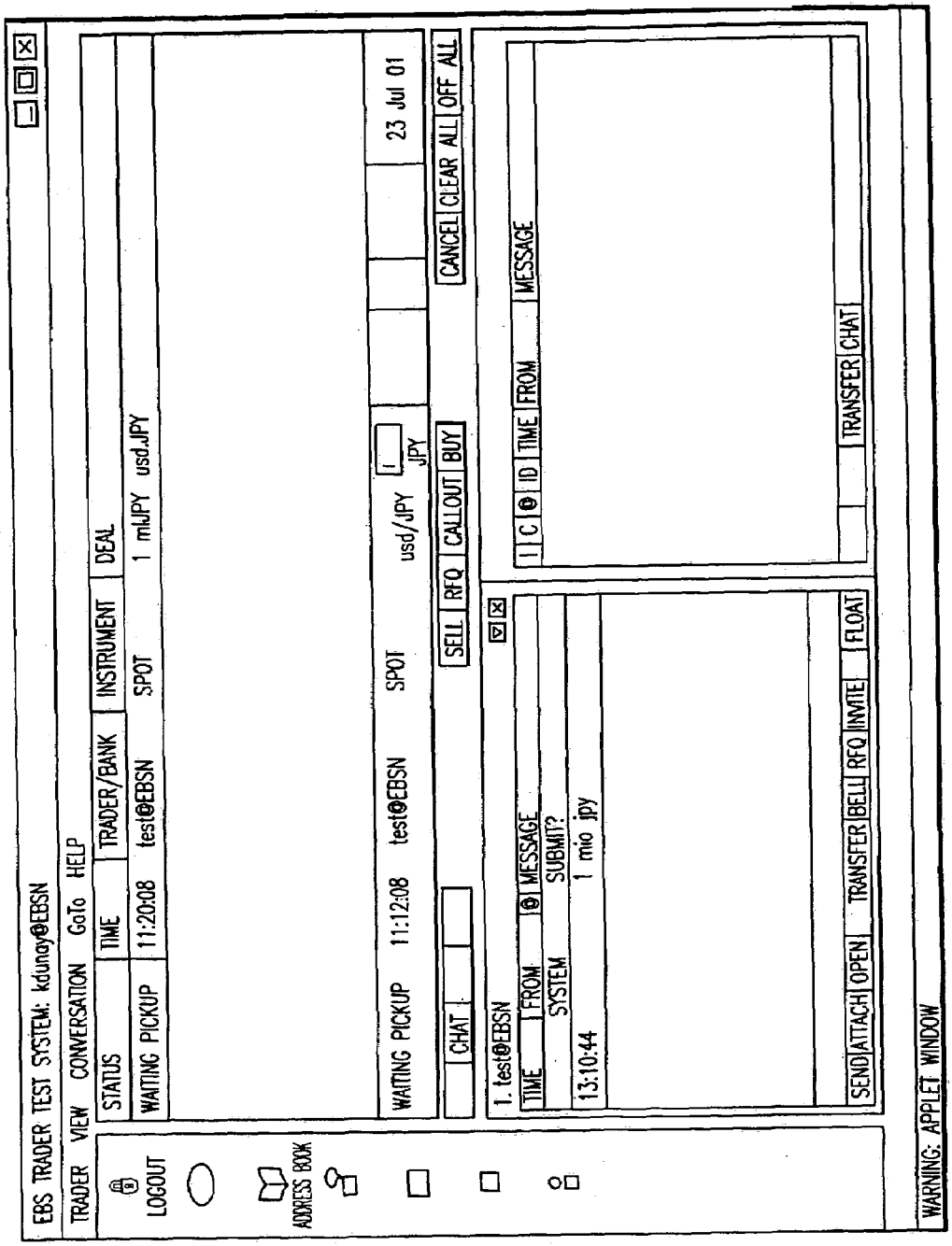
FIG. 10 shows the screen of FIG. 9 when the parsed message has been sent but not picked up.

FIG. 10 shows the user interface after the RFQ has been sent to the counterparty. The status of the deal in the deal stack is shown as 'waiting pick up' meaning that the User Interface has not been notified that the counterparty has picked up the deal from his incoming conversations panel. In the conversation panel for the deal, the client's conversation is now shown in a representative colour, for example green, to show that the message originated from the client.

Figure 11:
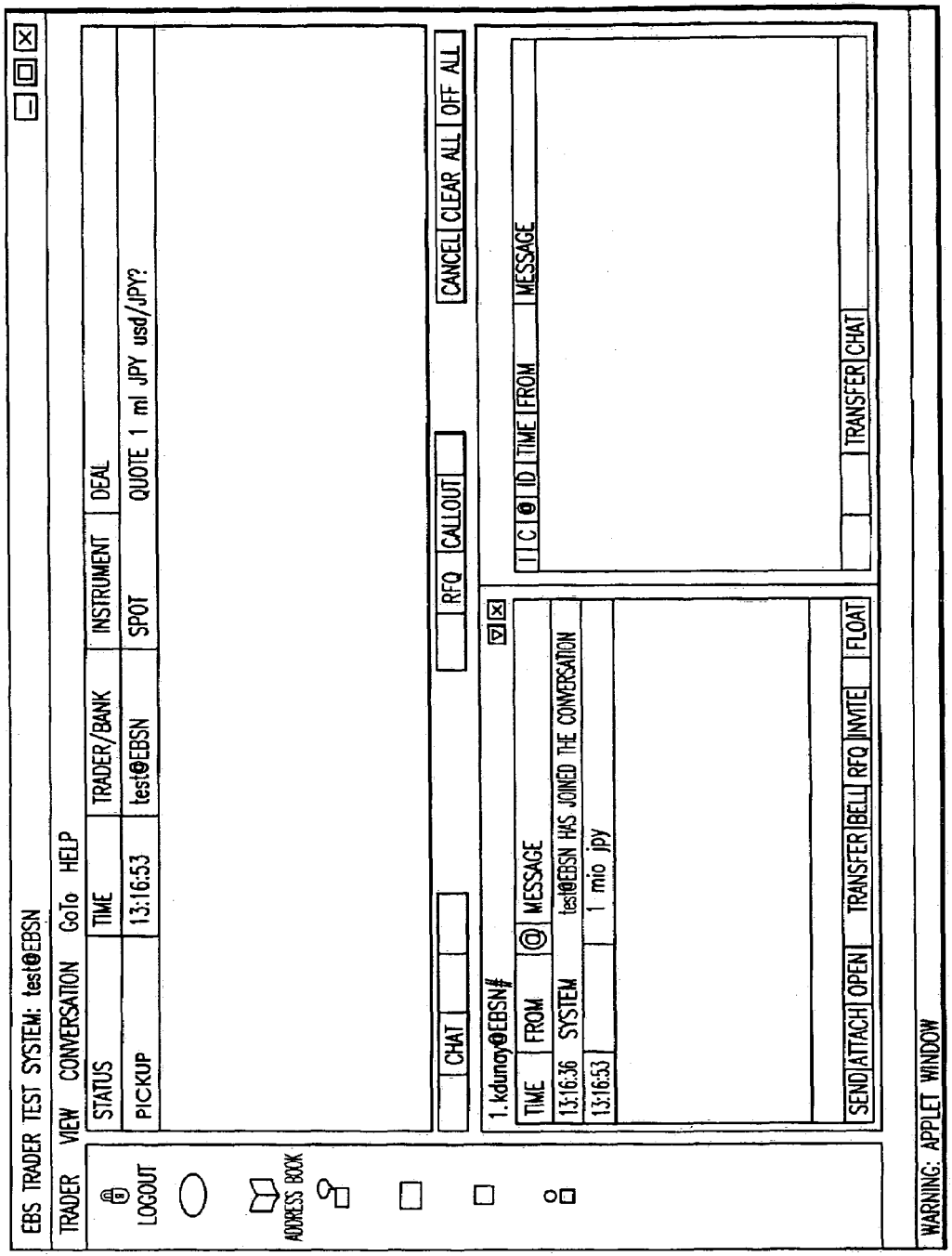
FIG. 11 shows the taker's interface when the parsed message is received.

Referring now to FIG. 11, there is shown the user interface of the client to whom the RFQ described in FIG. 8 has been sent. The client is identified as test@EBSN. The RFQ message has been passed by the deal server and relayed to client test@EBSN. The sending client User Interface has also been notified that the message has been sent. The incoming message will first appear in the client's incoming messages panel. In FIG. 9, client test@EBSN has doubled clicked that message to open up a new conversation in the active conversation panel. In the figure this is identified as conversation with the name of the counterparty, kdunay®EBSN identified. The system indicates in the conversation panel that client test@EBSN has joined the conversation and displays the parsed message in the deal stack. Note that the message is identified as Quote 1 mil JPY usd/JPY?—which is an embellished version of the parsed message displayed in the maker client's deal stack. The original version of the message is shown in the conversation panel. The message is shown in the conversation panel in a representative colour, for example blue, to indicate that it is an incoming message. In the deal stack, the status of the deal is shown as 'pickup' and coloured green indicating that action is required by the client. In this case the client has to respond to the RFQ.

The second client, test@EBSN then types in his response to the RFQ in the chat line 220 of the conversation panel and hits the send button 222. In the same manner as the RFQ line, this causes the User Interface to send the complete line of text to the parser which again parses the text and sends back the DealInfo structure to the User Interface. The parsed text, if it contains a change of status and the necessary deal related information is sent via the deal server to the counterparty. It should be noted that the parser for client kdunay@EBSN only parses conversation entered by that client and the parser at client test@EBSN only parses conversation entered by that client.

Figure 12:
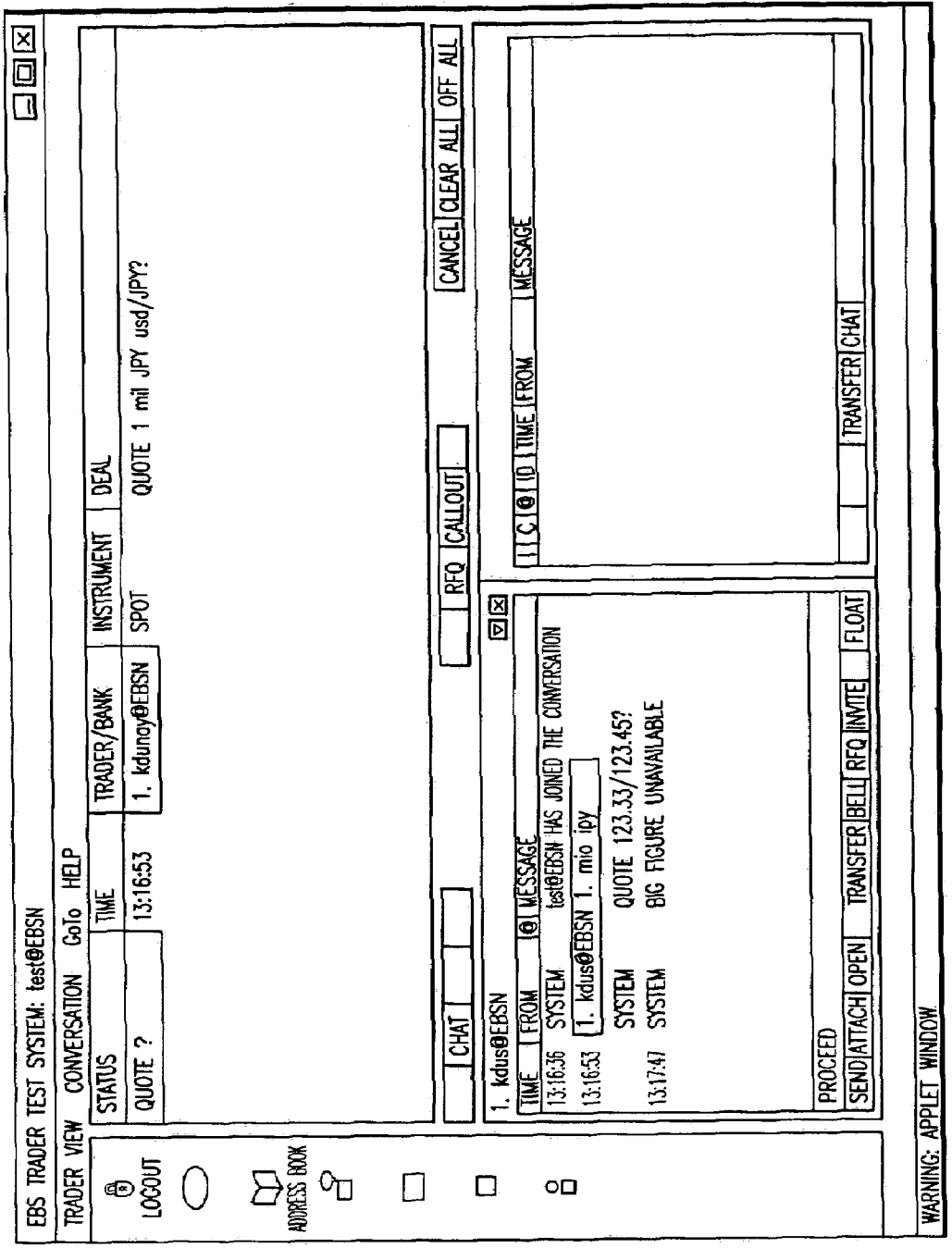
FIG. 12 shows the taker's interface when the system is waiting for the taker to quote.

FIG. 12 shows the counterparty client test@EBSN when a quote has been entered by the user and parsed by the parser but not confirmed by the user. The status in the deal stack shows Quote? and the conversation panel indicates the quote as parsed by the parser followed by a question mark. The chat line of the conversation panel invites the user to proceed. In FIG. 12, the status in the deal panel is shown in a representative colour showing a warning, in this case orange. The system displays a message in the conversation panel 'Big figure unavailable'. In this case the message is false and was generated as the rates panel was disabled but serves to illustrate how warnings can be shown.

Figure 13:
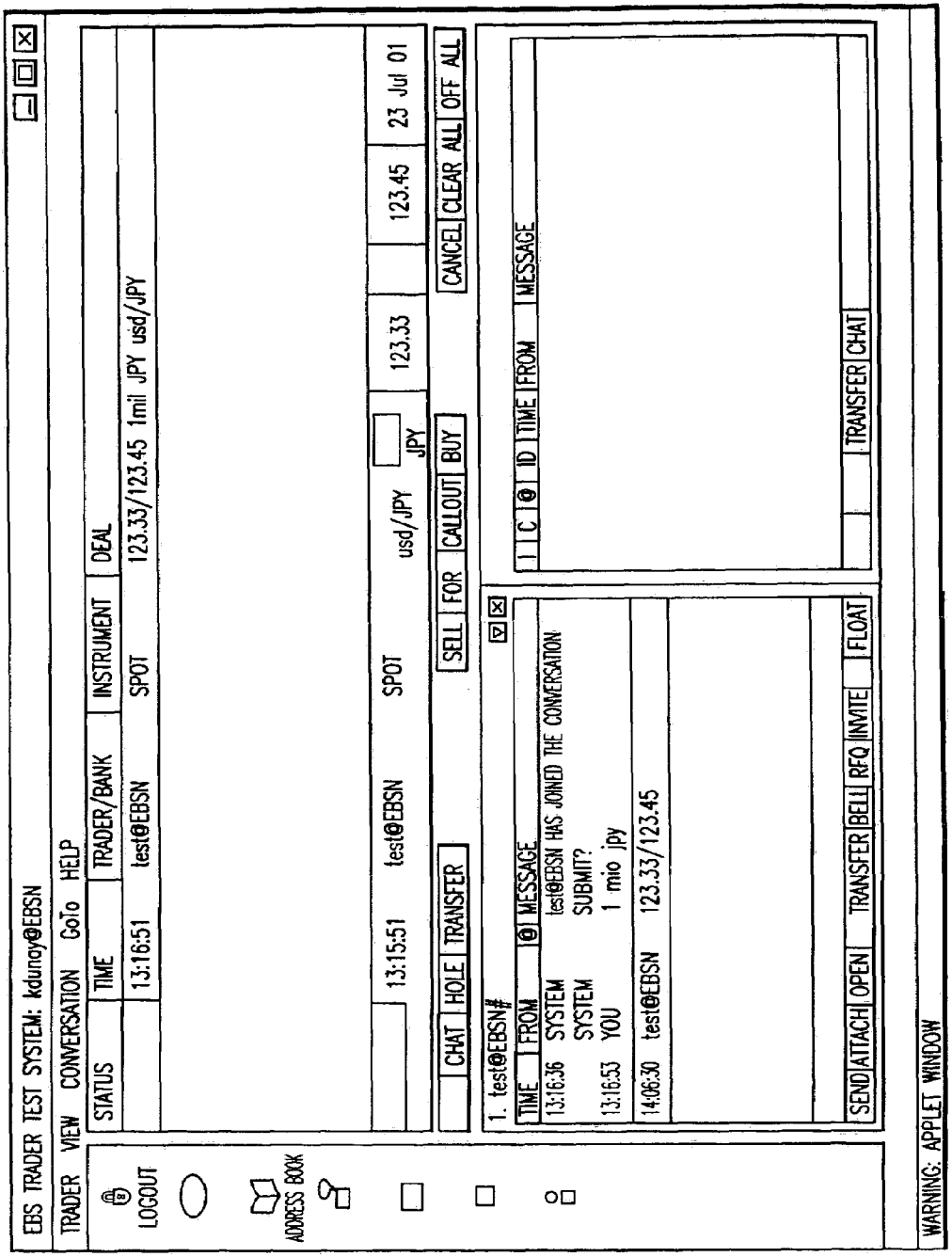
FIG. 13 shows the maker's screen when a quote is received.

FIG. 13 shows client kdunay@EBSN's user interface when the response is received. Client test@EBSN has submitted at quote in response to the RFQ shown as 123.33/123.35. These to figures are the buy/sell spread. This is shown in the conversation panel in blue as it is an incoming message. Note that the previous entry in the panel is the client's own conversation. This is shown in a representative colour, for example green. The deal stack shows the change in Status to Buy/Sell, highlighting the status in green. This shows that action is required by the client and that the next phase of the deal is either an agreement to buy and sell at the offer price or a denial. It can be seen that the deal information line shows the offer prices, the amount and the currency pair and that the large boxes on the bottom strip 212, 214 now include the buy/sell prices.

Figure 14:
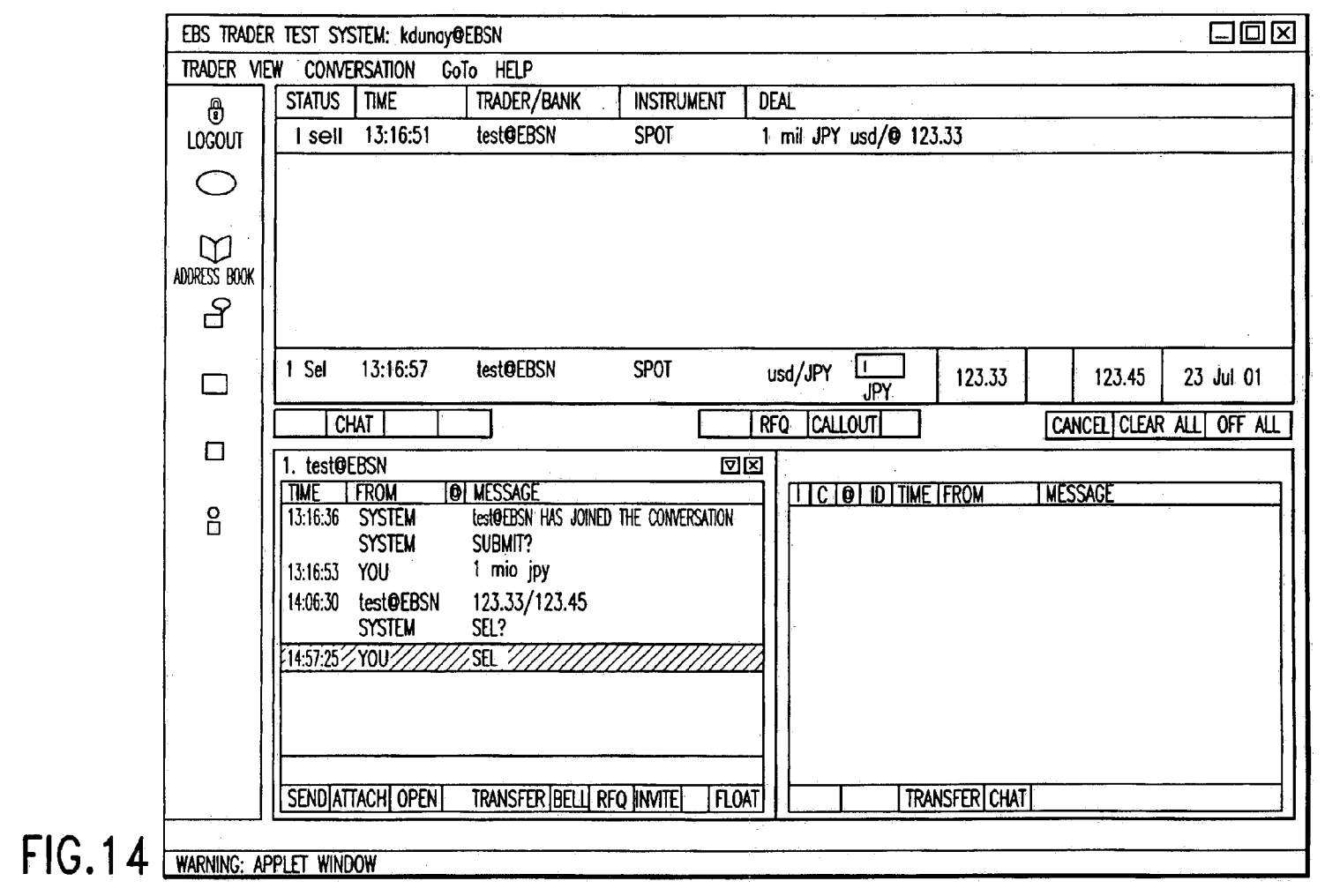

FIG. 14 shows the first client's interface after that client has replied to the quote by agreeing to sell at the offer price. The status has changes to I sell and the deal line now reads 'I sell 1 mil JPY usd/JPY@123.33. The last line in the conversation panel shows, in green that the client has sold and is preceded by a system prompt, in red, Sell? This prompt appears when the user types in 'Sell' and the change in status to sell is detected by the parser and returned to the User Interface but before the client has confirmed the sell by hitting the proceed button.

No matter what the status of a deal, the parser always looks for new RFQs and, if one is detected, opens a new conversation. Thus, in the previous example, instead of agreeing to sell, the client kdunay@EBSN could have put in a new request such as 'I want 1 mil gpb' indicating that he wants to buy one million £Sterling against $US. The parser detects this RFQ and opens a new conversation but does not terminate the existing conversation. The there are now two conversations between the same two parties. The ability to run several conversations between the same two countepar-ties simultaneously is highly desirable. The system can support a large number of simultaneous conversations between the same two counterparties, for example 10. This should not be confused with the ability to have a number of conversations open with different counterparties at the same time which is know in the art and also possible with the system embodying the invention. Conversation is shown in a third colour, for example blue.

The above discussion illustrates how the system handles a conversation input by the user. In the course of a deal there will be several lines of conversation, with each handled in the manner discussed. As soon as a parser has passed on the deal structure and the fields detected to the user interface the information is lost from the parser. The parser has no capacity or requirement to retain information regarding the history of the conversation.

Figure 7:
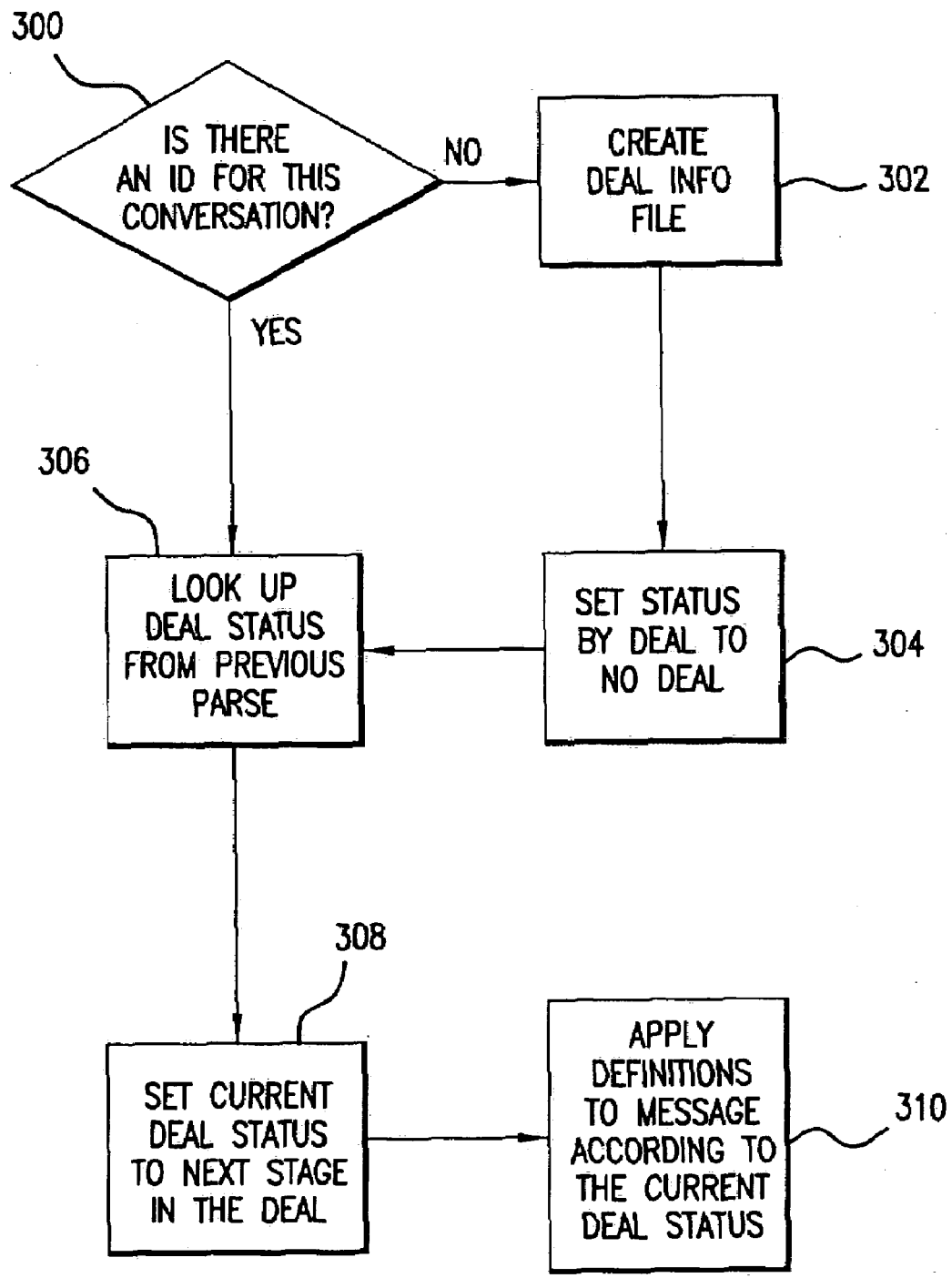
FIG. 7 is a flow chart showing an overview of the parsing process.

Turning back now to FIGS. 7 and 8. FIG. 7 shows an overview of the process described. At step 300, the parser looks to see if there is an identification number for a given conversation. If there is not, at step 302 it creates a new deal info structure and, at step 304, sets the status of the deal to Ano deal@. If there is an ID, it looks up the deal status at step 306 from the previous parse. However, this status is not held at the parser but is provided from the user interface. At step 308 the current deal status is set to the next stage in the deal and at step 310 definitions are applied to the message according to the current deal status. These determine which terms in the conversation the parser will acknowledge as being deal related information.

Figure 8A:
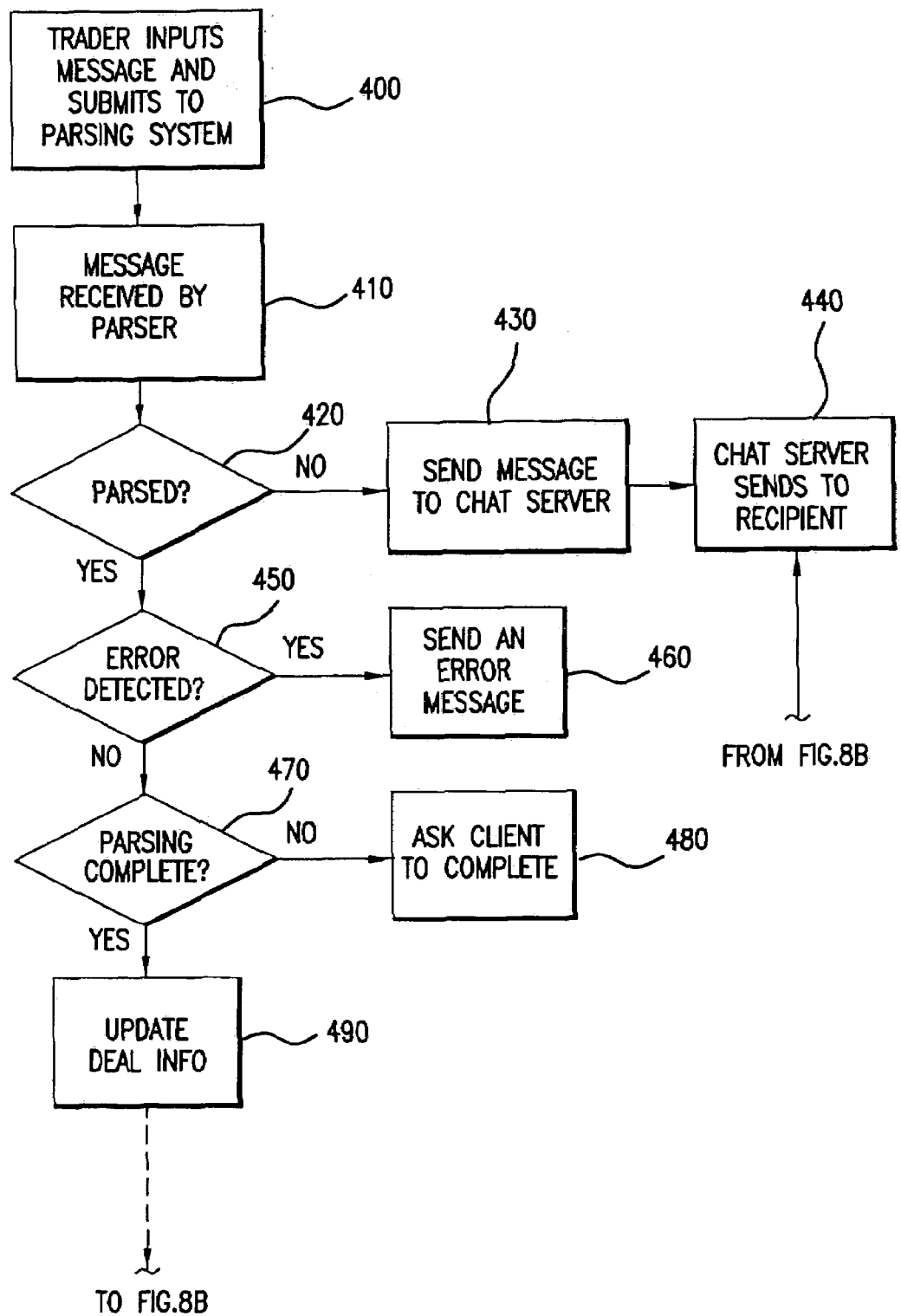
FIGS. 8a and 8b are flow charts showing the parsing process in more detail.
Figure 8B:
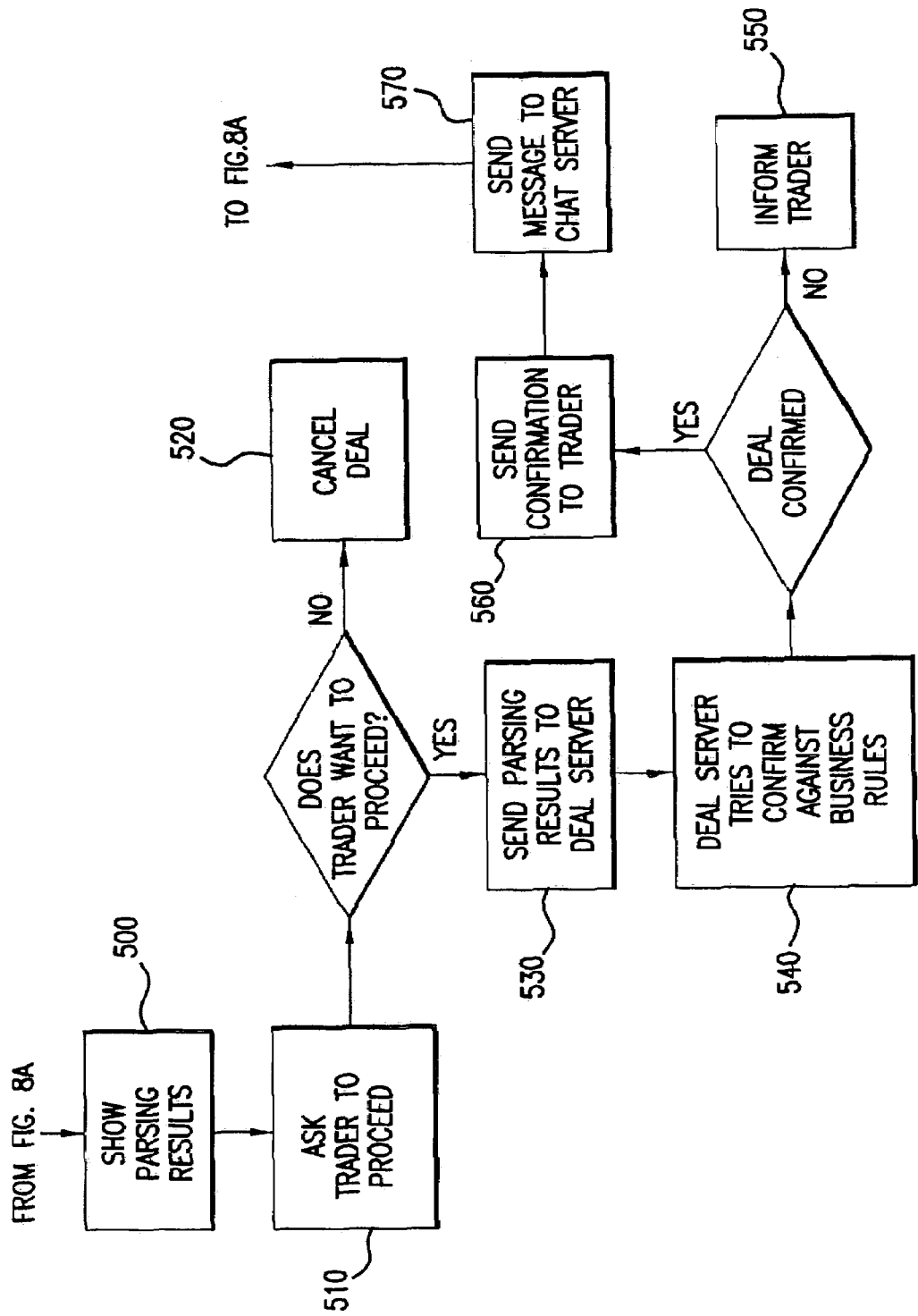

In FIGS. 8*a* and 8*b*, the trader inputs a message to the user interface at step 400. This message is sent by the user interface to the parser where it is received at 410. At 420 the parser attempts to parse the message. If it cannot be parsed, the conversational message is sent to the chat server at 430 and then to the intended recipient at 440. A message that cannot be parsed is one that has no deal related content.

If the parser can detect deal related information, at step 450 it determines whether or not there is an error. If an error is detected an error message is sent to the trader at 460.

If there is no error, at step 470 the parser determines whether or not parsing is complete. If it is not, the client is asked to complete the information at step 480.

If parsing is completed successfully, at step 490, the deal information file is updated and, at step 500, the parsing results are displayed at the user interface.

The trader must then decide whether or not they want to proceed and send the parsed message to the counterparty (at 510). The confirmation stage is performed by the proceed, edit and cancel buttons on the deal panel described previously. In the simplified diagram of FIG. 8*b*, the edit function is not shown. If the trader does not want to proceed, the deal is cancel at step 520 without having been shown to the counterparty. If they do want to proceed, at 530 the parsed message is sent to the deal server and at 540 the deal server tries to confirm the parsed message against the system business rules. If it cannot confirm the deal at step 550 the trader is informed but the counterparty trader receives no indication that the message was ever sent. If the deal is confirmed then a confirmation message is sent to the trader at 560 and also to the chat server at 570 and onto the recipient at 440.

Referring now to FIGS. 15 to 20, the chat panel is shown at various stages of progression of a conversation. These figures explain various aspects of the present invention.

The functionality of the chat server (60 FIG. 2) will first be explained. As explained previously, the chat server handles conversations between the counterparties logging each message as it is received, acknowledging each message to the sender and forwarding it to the intended recipient.

In the embodiment of the present invention, the chat server assigns a reference to each line of chat received from a workstation. Typically this is a reference number. This reference is always sent with a line of chat when the chat is sent from the chat server to the destination trader workstation. The reference numbers are unique throughout the trading system and do not wrap around (that is they do not return to zero or some other start point at some predefined value). When the chat server logs a line of chat it has received from a trader workstation, it will log the reference number it has assigned to that line along with the line in the chat database.

In order to deal with crossover, when the chat server receives any line of text from the workstation, it compares the reference number of the chat being responded to in the message to the reference number of the last chat message in the database. If the numbers are not identical, the chat server flags the message received from the workstation as a crossover in the chat database. The chat server also logs the reference number of the message being responded to as received from the workstation in the chat database.

Figure 21:
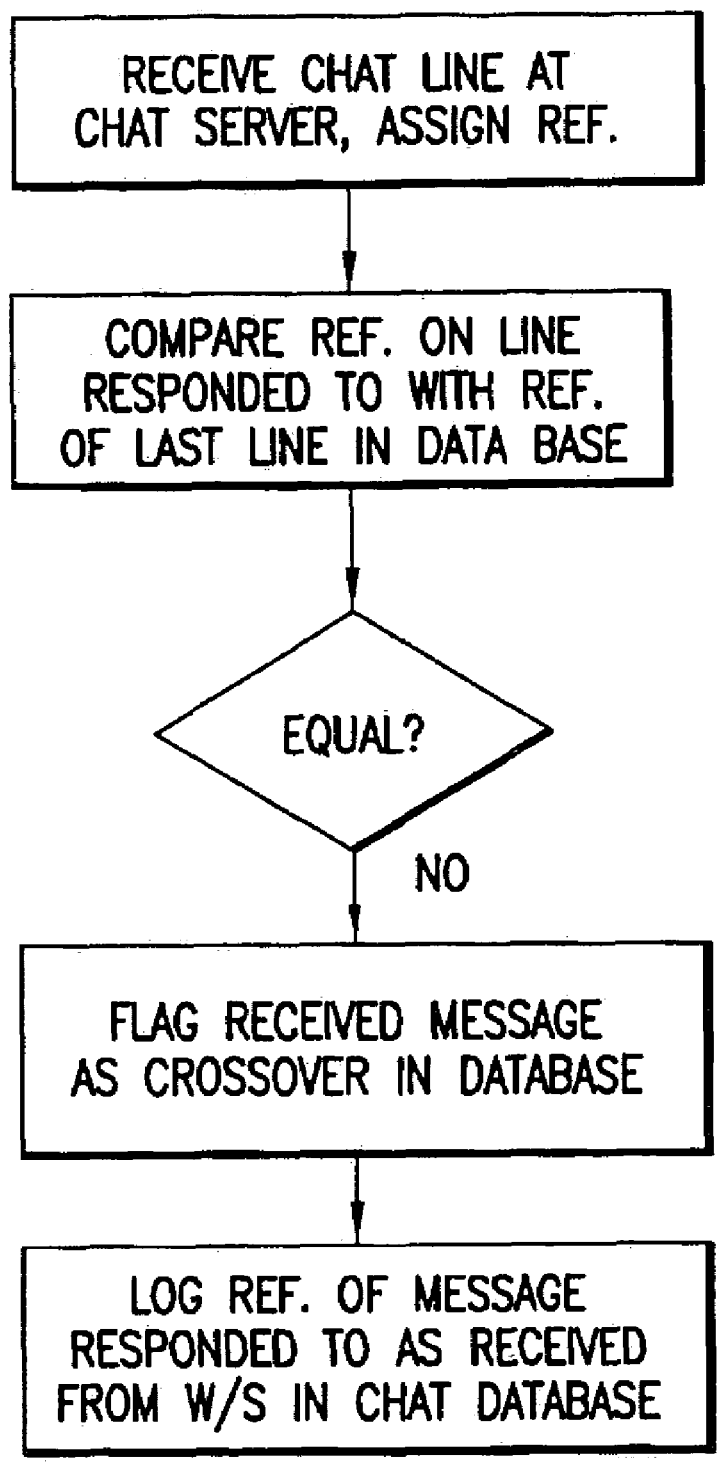
FIG. 21 is a flow chart showing the steps taken at the chat server to identify message crossovers.

This process is illustrated in the flow chart of FIG. 21.

In the embodiment described with reference to FIGS. 1 to 14, the system is Internet based and an applet provides the direct dealing functionality to the user. The following description relates to modifications to the applet although it will be appreciated that the functionality embodied does not have to be implemented by an applet. It could, for example, be programmed into each of the trader workstations and be resident on those workstations.

To inform the Applet, which is downloaded to a workstation on startup, of the reference number that has been assigned to a line of chat, the chat server uses the SendChatAck message which is used to acknowledge receipt of a message by the chat server to the applet. The applet does not display the line of chat until the reference number is received. Lines of chat are displayed in reference number order. Each counterparty applet displays the lines in the same order as they are displaying them in the order they reach the server. Each line of conversation, except the first in a new conversation, includes the reference number of the line of conversation in the context of which is was written (the context reference). This enables the chat server to identify crossovers.

In order to include the reference number of the context conversation line, the applet records the reference number of the last conversation line that is visible in the conversation panel's list of messages whenever a message is sent to the chat server.

Figure 22A:
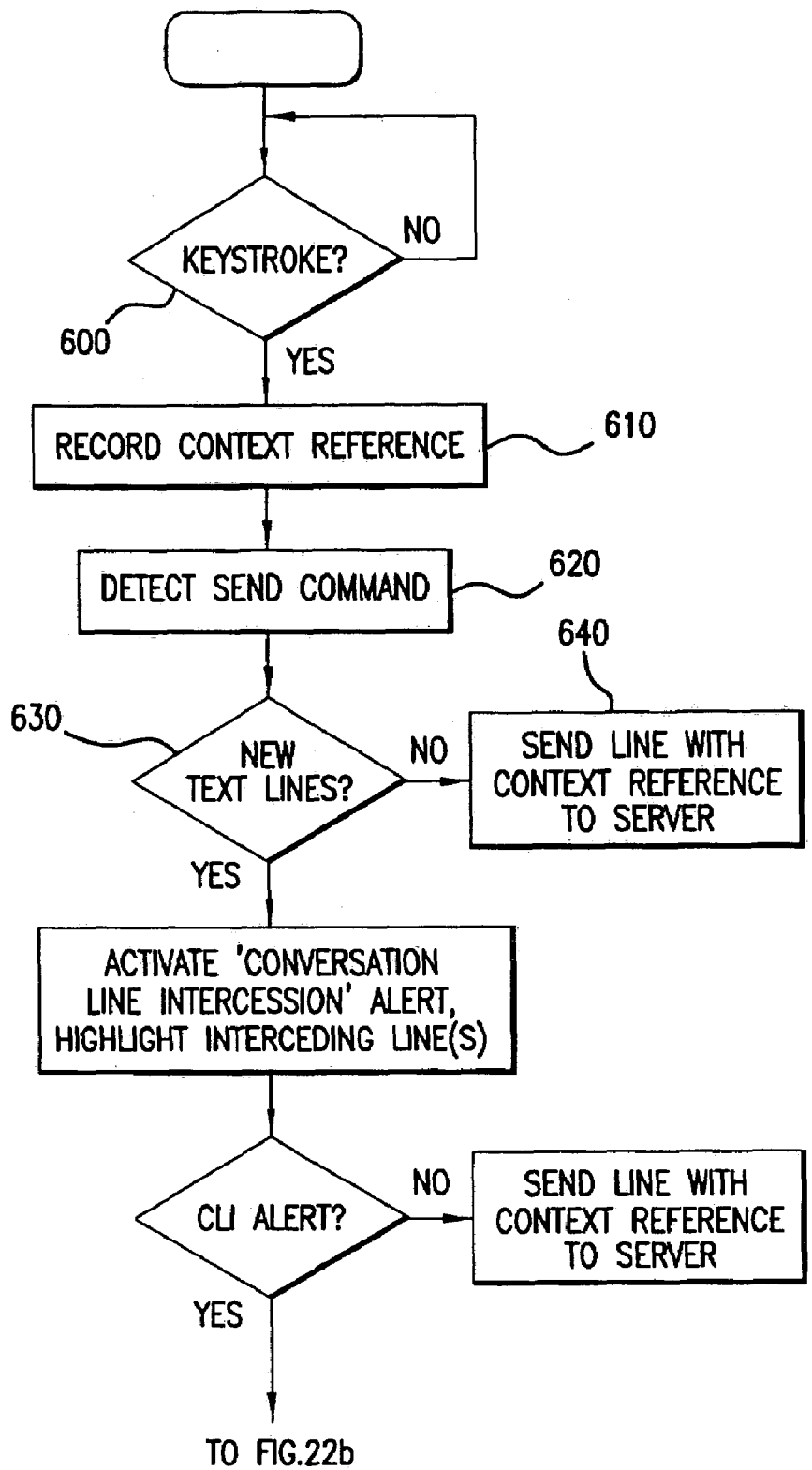
FIGS. 22a and 22b are a flow chart showing the steps taken at the user interface to identify lines of conversation received while the user is constructing a new line of conversation.
Figure 22B:
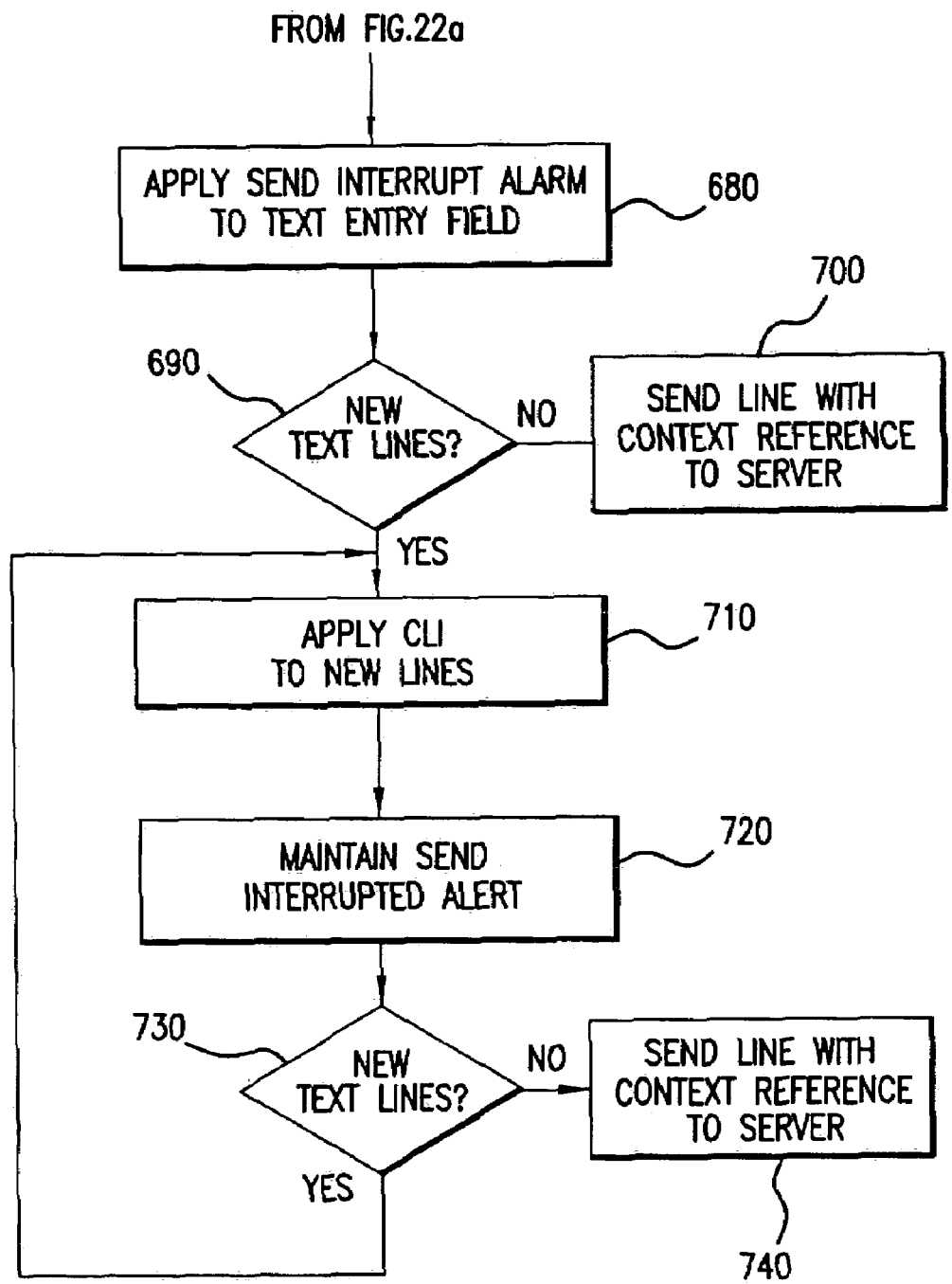

Referring now to FIG. 22, the step of recording the reference number of the last conversation line that is visible is shown at 610, with the system continuously checking for a keystroke, or other indication of the beginning of a new line of conversation at 600.

If no lines of text are added to the received message list, in the time between the trader started to type a new line of text and the time the trader attempts to send the new line of text to the server, the new line of text is sent normally. As mentioned above, a "send" command may be instructed in a number of ways. The information which is sent includes, as its context reference, the reference number captured at step 610 when typing started. In FIG. 22, the decision whether to send a line, that is whether there are any additional lines of text in the received message list, is taken at step 630 after a send command has been detected at step 620 and the text line is sent as step 640.

Where the answer to the question at step 630 is yes, that is that new text lines are added to the message list after the trader starts to type his line of conversation, the interceding line or lines are highlighted as shown in FIG. 15. Here, the trader has started to type a line 800 in text entry field 700 commencing with the word "can" before the line 802 starting with "anything we can . . . " is received from trader wim@ABNA. The highlighting is performed using a Conversation Line Intercession Alert. This Alert may add, for example, a pink background to the message cell of all interceding lines.

Figure 16:
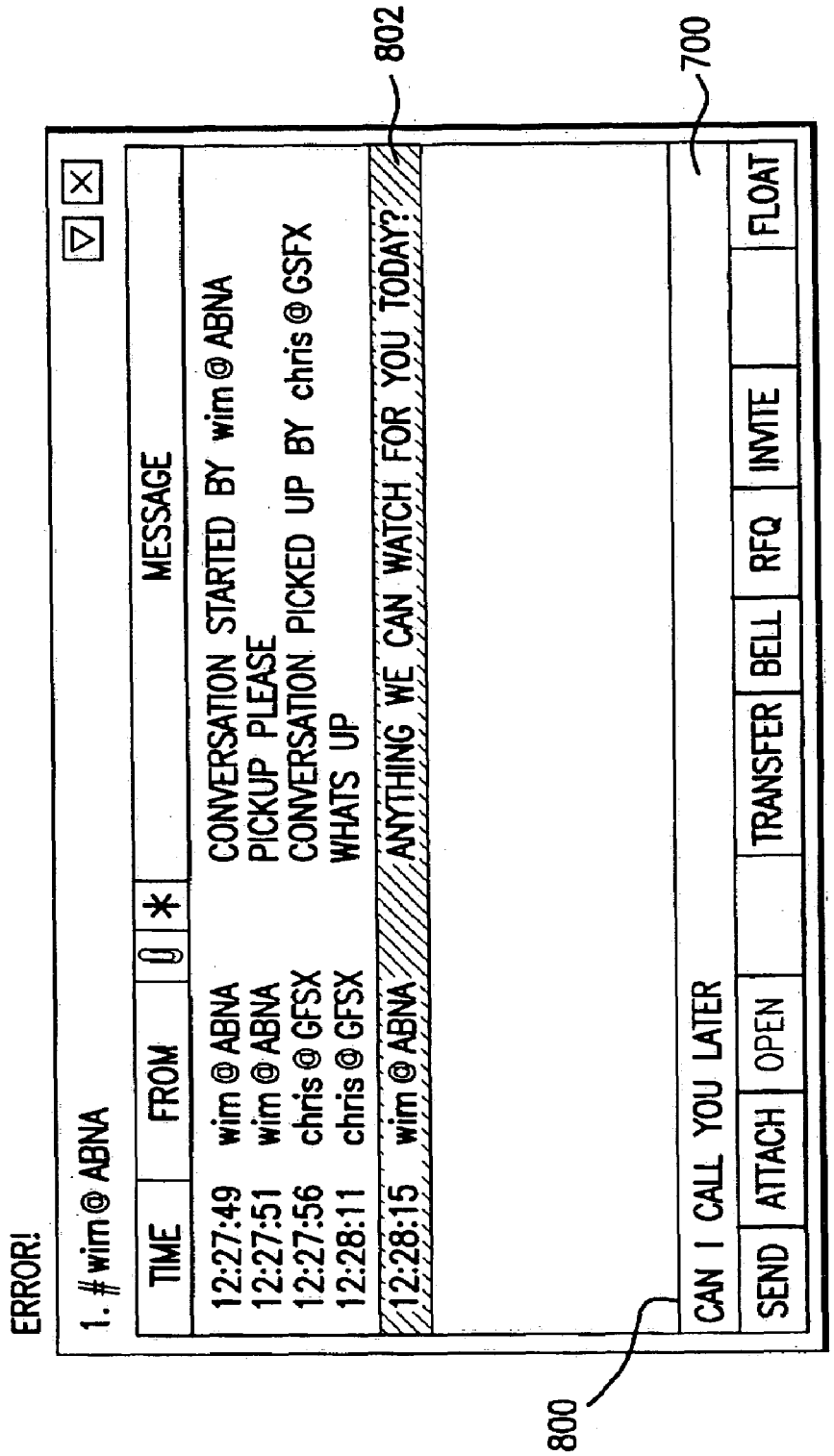
FIG. 16 shows the chat panel of FIG. 15 with a completed line of conversation.

If the Conversation Line Intercession Alert is in force when the trader attempts to send the line of conversation to the server, the line of conversation is not sent and a Send Interrupted Alerts is applied to the text entry field. This is shown in FIG. 16, which shows the text entry field with a pink background. The background will turn pink as the trader hits the send key alerting him to the fact that the Conversation Line Intercession Alert is in force and requiring him to check that the line he is trying to send 800 is still applicable in the context of the last line 802 received.

Both the Alerts described could be any colour and may include or solely consist of an audio indicator such as a unique distinct sound. The trader may use distinct audio alerts for incoming and outgoing messenger. Typically, the audio indicators may be disabled by traders.

FIG. 17 shows the situation where the "Send Interrupted Alert" is in force (i.e., the trader has already been notified that more message lines have been received since the trader stated typing the new line of text) and the trader attempts to send the new line of conversation 800 and more lines have been added since the last attempt to send to the server. In this case, the line of conversation will not be sent and the Send Interrupt Alert continues to be applied to the text entry field 800. The Conversation Line Intercession Alert is only applied to those lines that have been added since the last send attempt. Thus, in FIG. 17, the trader's second attempt to send line 800 is interrupted by the line starting with "doing anything . . . " line 804.

FIG. 18 shows the situation where no additional lines of conversation have been added between the latest send command and the previous attempt to send the line to the server. The new line of text 800 is then sent normally and includes as its context reference the reference of the last line that is visible in the message list. In FIG. 18, the line "can I call you later" 806 has been sent and will have the reference of line 804 "doing anything after work" as its context reference. When the line is sent, the text entry field 700 is cleared and set to its usual background colour, for example cyan.

If a trader receives a Send Interrupted Alert, they may wish to modify the text of the message that is in the text entry field 700. If the text is modified, the Conversation Line Intercession Alert is cleared and the system records the reference number of the last visible conversation line in the message list. After the trader starts to modify the text, the visual indicator from the Send Interrupted Alert (the change in background colour) continues to let the trader know that a Send Interrupt has taken place. The process then proceeds as if a new line of text had been typed in by the trader.

Even though a clean send has been achieved, it is possible for the server to receive the sent line of conversation after it has received a new line from the counterparty but before that new line has been sent out to the trader. In this situation, the server allocates reference numbers to the lines in strict chronological order.

Detected crossovers are displayed to the trader using an additional column in the chat panel. Referring to FIG. 19, although the feature is also shown in each of FIGS. 15 to 19, an additional column 808 indicated by an asterisk icon is arranged between the attachment (paperclip icon) column 810 and the message column 812.

An asterisk appears in this column where the chat server or trader workstation has detected a crossover, that is the crossover icon indicates a conversation line whose context reference does not match the reference number of the conversation line immediately preceding it in the message list.

The context column 808 may be used by the trader to display the actual context that was recorded for a sent conversation line. This display is achieved by selecting "show context" from the conversation panel's pop-up menu although it could be accessed in any other convenient way. For example, the user may opt to have the context automatically displayed for any new conversation line in the message list that has a cross over. When invoked, icons indicating the actual context of the line are displayed in the crossover column 808. This is shown in FIG. 20 in which the icons in the crossover column indicate that the context for line 816 is not line 814 but actually, line 812.

The various icons that may be used, together with crossover status and descriptions are shown in table 1 below. Clearly, this list is not exhaustive and other symbols may be used.

Figure 23:
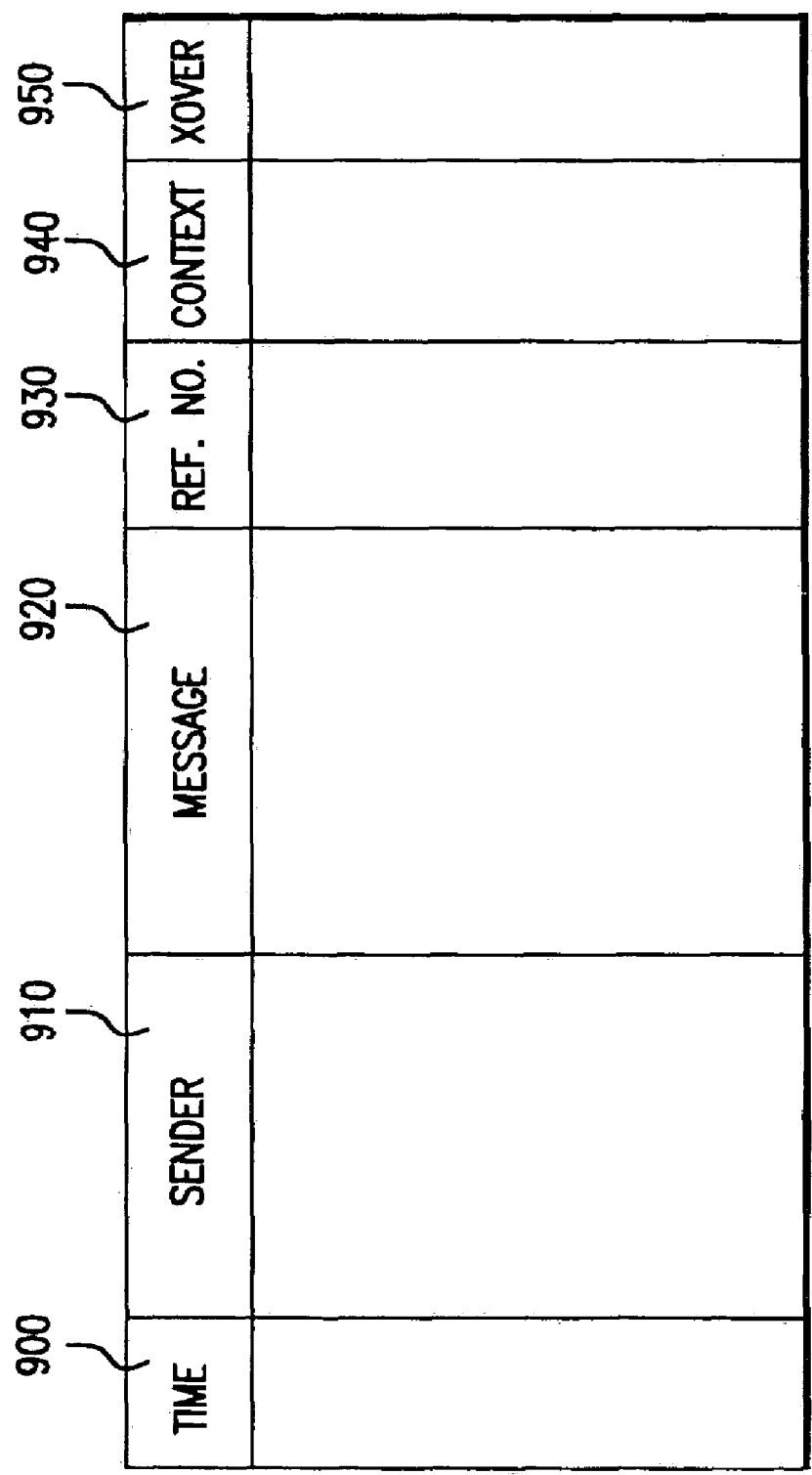
FIG. 23 shows the data that is logged at the chat server.

Turning now to the chat archive stored at the chat server 20 (FIG. 2), FIG. 23 illustrates, schematically, the structure of a chat archive. The archive is, in effect, a large database holding details of all chat lines that have been sent to the server. The database includes columns identifying the time 900, sender 910, message 920, reference number 930, context reference 940 and crossover 950.

The "Send Interrupted" alerts are logged in the conversation and viewable from the chat archive. These logged lines are not sent to the counterparty and are logged in the form "Send Interrupt with Context Reference nnn"—where "nnn" is the context reference that the alert is based on.

As described above, various messages are sent between the chat server and the trader workstation applets. Reference numbers are appended to these messages. Thus, whenever an applet sends a chat message to a chat server, a Send Chat message is sent. This includes a field for the reference number of the last line displayed on screen since the applet started tracking a new message; that is when a keystroke or other new message start command was detected by the applet.

When the chat server 20 receives a Send Chat message it acknowledges it with a SendChatAck message. This message includes the reference number of the new chat line that has been sent by the applet. The chat server sends chat messages received in a SendChat message to the destination applet in a ReceiveChat message. This message has a field which includes the reference number of the chat line.

It will be appreciated from the above description that the embodiment has the advantage of being able to handle both lines of conversation which arrive after a trader starts typing and crossovers. In so doing, it overcomes the disadvantages discussed in the introduction and so enhances the value and usefulness of duplex chat based systems.

Many modifications to the embodiment described are possible without departing from the scope of the invention and will occur to those skilled in the art. For example, although the description has been given in relation to the trading of financial instruments, it is applicable to any trading system, no matter what is being traded. It is also not limited to trading systems but is applicable to any system in which accurate duplex chat is desired to exchange messages between parties, with messages being sent very frequently.

The scope of the invention is not limited to any particular implementation such as the provision of trader functionality through applets in an Internet based system but is applicable to any computerized system involving an intermediate chat server, however implemented.

TABLE 1

| Icon | Has "Crossover" | Show Context Status | Description |
|---|---|---|---|
|  | No | None | Regular Line (No "Crossover") |
| * | Yes | None | Line has crossed over and: is not showing its context |
|  | Yes | Start | Line has crossed over and: is the start of a context show |
|  | No | Interceding | Line has not crossed over and: is positioned between a crossed over line that is showing its context and the matching context line. |
|  | Yes | Interceding | Line has crossed over (but is not showing its context line) and: is positioned between a crossed over line that is showing its context and the matching context line. |
|  | No | Context Line | Line has not crossed over and: is the context line for a crossed over line that is showing its context |
|  | Yes | Context Line | Line has crossed over (but is not showing its context) and: is the context line for a crossed over line that is showing its context |

What is claimed is:

1. A method for sending messages in a duplex messaging system, the method comprising:
    detecting commencement of entry of a new message at a first messaging station;
    while the new message is being entered, and until the new message is sent, monitoring for an incoming message from a second messaging station; and
    if the incoming message is detected during the monitoring, alerting a user of the first messaging station to the incoming message, wherein
    a message server is disposed intermediate the first and second messaging stations and the method further comprises
    assigning a reference to each message by the message server;
    logging received messages with respective references at the message server;
    comparing the reference of a particular received message with the reference of the last logged message; and
    if the reference of the particular received message and the last logged message are not substantially identical, marking the particular received message as crossover.

2. A method according to claim 1, further comprising displaying an indication that a crossover has been detected at one or both of the first and second messaging stations.

3. A method according to claim 2, wherein the indication includes a context of the crossover.

4. A method for sending messages in a duplex messaging system in which messages are sent between a first messaging station and a second messaging station via a message server, the method comprising the steps of:
    receiving a first message at a server;
    assigning a first reference to the first message;
    logging the first message and the first reference in a log;
    receiving a second message at the server after the first message, the second message including a second reference to a previous message;
    logging the second message and the second reference at the server;
    comparing the second reference with the reference in the log immediately preceding the second message; and
    indicating that there has been a message crossover when the second reference and the reference immediately preceding in the log do not substantially match.

5. A method according to claim 4, wherein the indicating includes sending an indication to one or both of the first and second messaging stations.

6. A method according to claim 5, wherein the indication comprises an icon.

7. A method according to claim 5, wherein the indication shows the context of the crossover.

8. A method according to claim 4, wherein each reference is unique.

9. A method according to claim 4, wherein on receipt of at least one of the first and second messages from one of the first and second messaging stations, the server forwards the at least one of the first and second messages and respective reference to the other of the first and second messaging stations.

10. A method according to claim 9, further comprising acknowledging receipt of at least one of the first and second messages the acknowledging including the respective reference.

11. A method of conversational dealing in which a first and second trader negotiate trades of instruments by exchange of messages between trader workstations in a duplex messaging environment, the method comprising the steps of:
    at a first trader workstation, detecting commencement of entry of a new message by a first trader relating to a conversation between the first trader and a second trader;
    monitoring for an incoming message to the first trader workstation relating to the conversation and received between the detected commencement of entry of the new message and an attempt to send the new message from the first trader workstation to a second trader workstation;
    on detection of the incoming message, alerting the first trader to the incoming message; and
    interrupting a sending of the new message,
    wherein messages are sent between the trader workstations via a message server, and the method further comprising:
        on receipt of each message at the server, assigning a respective reference to a respective message;
        storing messages received at the server with corresponding references;
        comparing the reference of a particular message received at the server with the reference most recently stored at the server; and
        if the compared references are not the same, notifying one or both traders of a message crossover.

12. A method according to claim 11, wherein notifying comprises displaying an icon.

13. A method according to claim 12, wherein each workstation displays a list of messages sent and received and the icon identifies a crossover message for which a crossover has been detected.

14. A method according to claim 12, wherein the icon includes an indication of crossover context.

15. A method of conversational dealing in which traders negotiate trades of instruments by exchange of messages between respective trader workstations via a message server in a duplex messaging environment, the method comprising:

at the message server:
on receipt of a first message from a first workstation, assigning a first reference to the first message;
logging the first message with the first reference in a log;
forwarding the first message to an intended recipient workstation together with the first reference;
acknowledging the first message to the first workstation along with the first reference;
and on receipt of a second message including a second reference from a second workstation, comparing the second reference with the reference in the log immediately proceeding the second reference and, if the second reference and the reference immediately preceding the second reference in the log are not the same, notifying the second workstation of a crossover; and
at a particular workstation;
on detection of commencement of entry of a new message by a particular trader to be sent from the particular workstation to a counterparty workstation, monitoring for an incoming message to the particular workstation while the new message is being entered; and
on detection of the incoming message, alerting the particular trader of the incoming message.

16. A method of conversational dealing in which traders negotiate trades of instruments by exchange of messages between trader workstations in a duplex messaging environment, and in which messages are exchanged via a message server which logs messages on receipt and acknowledges a received message to a sending party who sent the received message, the method comprising the steps of:

receiving a first message from a first messaging station;
assigning a first reference to the first message;
logging the first message and the first reference in a log;
receiving a second message from a second messaging station at the server after the first message, the second message including a second reference to a previous message;
logging the second message and the second reference at the server;
comparing the second reference with the reference in the log immediately preceding the second message; and
notifying one or both of the first and second messaging stations that there has been a message crossover when the second reference and the reference immediately preceding in the log do not substantially match.

17. A method of conversational dealing in which traders negotiate trades of instruments by exchange of messages between trader workstations in a duplex messaging environment, the method comprising the steps of:
at a first trader workstation, detecting commencement of entry of a new message relating to an ongoing conversation between the first trader workstation and a second trader workstation;
monitoring for an incoming message to the first trader workstation relating to the conversation upon the detection of the commencement of entry of the new message; and
on detection of the incoming message, notifying the first trader of the incoming message prior to sending the new message,
wherein the notifying comprises displaying an icon at one of the messaging stations, the icon including an indication of the context of the crossover.

18. A method according to claim 16, wherein each reference is unique.

19. The method as recited in claim 16, wherein the alerting includes at least one of an audio indication and highlighting a representation of an incoming image.

20. A duplex messaging system comprising a plurality of messaging stations for exchanging conversational messages, each of the messaging stations comprising:
means for detecting the commencement of an entry of a new message relating to an existing conversation with a counterparty in the messaging system;
monitoring means for monitoring for an incoming message from the counter party while the new message is being entered; and
alerting means for alerting a user of the incoming message detected by the monitoring means, wherein:
each workstation comprises means for sending a completed message;
the alerting means includes means for inhibiting the means for sending if the incoming message has been detected; and
the means for sending means comprises means for confirming, amending or canceling the new message in response to an alerting from the alerting means.

21. A system according to claim 20, wherein:
the monitoring means further monitors for an additional incoming message received after
generation of an alert by the alerting means and prior to an attempt to send an amended message by the means for sending; and
wherein the alerting means generates a further alert and inhibits the means from sending the amended message on detection of the additional incoming message.

22. A duplex messaging system comprising a plurality of messaging stations for exchanging conversational messages, each of the messaging stations comprising:
means for detecting the commencement of an entry of a new message relating to an existing conversation with a counterparty in the messaging system;
monitoring means for monitoring for an incoming message from the counter party while the new message is being entered; and
alerting means for alerting a user of the incoming message detected by the monitoring means;
a message server for receiving incoming messages sent by sender workstations and forwarding the incoming messages to intended destination workstations, the server comprising:
a message log for logging the incoming messages; and
means for assigning a respective reference to each incoming message; wherein
the message log logs the respective assigned reference with a respective message, and wherein
the server comprises: means for notifying a particular party receiving a particular message of the reference assigned to the particular message;
the server receives a reply to a select message with a respective reference to the select message;
the server comprises means for comparing the respective reference of the select message, with the reference of the most recently logged message; and
the server comprises means for notifying one or both of the sender of the select message and the intended receiver of the select message of a crossover if the respective reference of the select message and the reference of the most recently logged message are not substantially the same.

23. A system according to claim 22, wherein each of the message stations include means for displaying a crossover notified by the message server.

24. A system according to claim 23, wherein the display means comprises an icon.

25. A system according to claim 24, wherein the icon includes an indication of the context of the crossover.

26. A duplex messaging system comprising a plurality of messaging stations for exchanging conversational messages, each of the messaging stations comprising:
means for detecting the commencement of an entry of a new message relating to an existing conversation with a counterparty in the messaging system;
monitoring means for monitoring for an incoming message from the counter party while the new message is being entered; and
alerting means for alerting a user of the incoming message detected by the monitoring means;
a message server for receiving incoming messages sent by sender workstations and forwarding the incoming messages to intended destination workstations, the server comprising:
a message log for logging the incoming messages; and
means for assigning a respective reference to each incoming message; wherein the message log logs the respective assigned reference with a respective message, and wherein each reference assigned by the message server is unique.

27. A duplex messaging system, comprising a plurality of messaging stations for exchanging conversational messages, a particular messaging station comprising:
a detector which detects the commencement of entry of a new message into the particular messaging station;
a monitor which monitors for an incoming message to the particular messaging station from others of said plurality of messaging stations while the new message is being entered; and
an alert generator which generates an alert to alert the user of the particular messaging station of the incoming message, the incoming message originating from another messaging station in a conversation with the particular messaging station, and received at the particular messaging station before an attempt to send the new message by the user,
wherein the system further comprises a message server disposed between the messaging stations which receives and forwards incoming messages to intended destinations, the message server comprising:
a reference generator which assigns a respective reference to an incoming message from a sender message station;
a message log which logs the incoming message with the respective assigned reference;
a message acknowledger which acknowledges the received incoming message and returns a respective assigned reference to the sender message station;
a message forwarder which forwards the received incoming message to an intended destination together with the respective assigned reference;
a comparator which compares a reference of the incoming message with the most recent reference logged at the server; and
a crossover notifier which notifies one or both of the sender and receiver of the incoming message of a crossover if the references compared by the comparator are not substantially the same.

28. A duplex messaging system comprising:
a plurality of messaging stations which exchange conversational messages; and
a message server arranged between the messaging stations which receives messages from sending stations and forwards the messages to intended stations, the message server comprising:
a reference generator which assigns a respective reference to incoming message received from a sending message station;
a message log which logs the incoming message with the respective reference;
a message acknowledger which acknowledges the incoming message and returns the respective reference to the sending message station;
a message forwarder which forwards the incoming message to an intended destination station together with the respective assigned reference;
a comparator which compares the reference of the incoming message with the most recent reference logged at the server; and
a crossover notifier which notifies one or both of the sender message station and the intended destination station of the incoming received message of a crossover if the references compared by the comparator are not substantially the same.

29. A system according to claim 28, wherein each of the messaging stations comprises a display which displays a crossover notification from the message server.

30. A system according to claim 28, wherein each messaging station comprises an icon generator which generates a crossover icon for display in response to a crossover notification from the server.

31. A system according to claim 30, wherein the icon indicates the context of the crossover.

32. A duplex messaging system comprising:
a plurality of messaging stations which exchange conversational messages; and
a messager server arranged between the messaging stations for receiving messages from sending stations and forwarding the messaged to intended destinations, the message server comprising:
means for generating references and assigning a respective unique reference to each message received at the server;
means for logging received messages with respective references;
means for acknowledging a received message received from a sender message station and returning the respective assigned reference to the sender message station;
means for forwarding the received message and respective references to an intended destination;
means for comparing the reference of the received message, with the most recent reference logged at the server; and
means for notifying the sender message station and the intended destination of the received message of a crossover if the references compared by the comparing means are not substantially the same.

33. A conversational dealing system for negotiation of trades between traders by exchange of messages between trader workstations operating in a duplex messaging environment, wherein each trader workstation comprises:

means for detecting the commencement of an entry of a new message into the trader workstation;

monitoring means for monitoring for an incoming message to the trader workstation from another of said plurality of workstations while the new message is being entered; and alerting means for alerting a trader working on the trader workstation to the incoming message detected by the monitoring means originating from the another of the plurality of workstations in a conversation with the trader workstation, wherein:

each workstation comprises a means for sending a completed message;

the alerting means includes means for inhibiting the means for sending if the incoming message has been detected; and the sending means comprises means for confirming, amending or canceling the new message in response to an alert from the alerting means.

34. A system according to claim 33, wherein:

the monitoring means further monitors for a further incoming message received after generation of an alert by the alerting means and prior to an attempt to send an amended message by the sending means; and the alerting means generates a further alert and inhibits the sending means from sending the amended message on detection of the further incoming message by the monitoring means.

35. A conversational dealing system for negotiation of trades between traders by exchange of messages between trader workstations operating in a duplex messaging environment, wherein each trader workstation comprises:

means for detecting the commencement of an entry of a new message into the trader workstation;

monitoring means for monitoring for an incoming message to the trader workstation from another of said plurality of workstations while the new message is being entered;

alerting means for alerting a trader working on the trader workstation to the incoming message detected by the monitoring means originating from the another of the plurality of workstations in a conversation with the trader workstation;

a message server for receiving incoming messages sent by sender workstations and forwarding the incoming messages to intended destination trader workstations, the server comprising:

a message log for logging the incoming messages; and means for assigning a respective reference to each incoming message;

wherein the message log logs the respective assigned reference with a respective message, and wherein:

the server receives a reply to a select message with a respective reference to the select message;

the server comprises means for comparing the respective reference of the select message, with the reference of the most recently logged message; and the server comprises means for notifying one or both of the sender of the select message and the intended receiver of the select message of a crossover if the respective reference of the select message and the reference of the most recently logged message are not substantially the same.

36. A system according to claim 35, wherein the server comprises means for notifying a sending party sending a particular message of the respective reference assigned to the particular message.

37. A system according to claim 35, wherein the server comprises means for notifying a party receiving a particular message of the respective assigned reference assigned to the particular message.

38. A system according to claim 35, wherein each of the message stations include means for displaying a crossover notified by the message server.

39. A system according to claim 38, wherein the display means comprises an icon.

40. A system according to claim 39, wherein the icon includes an indication of the context of the crossover.

41. A conversational dealing system for negotiation of trades between traders by exchange of messages between trader workstations operating in a duplex messaging environment, wherein each trader workstation comprises:

means for detecting the commencement of an entry of a new message into the trader workstation;

monitoring means for monitoring for an incoming message to the trader workstation from another of said plurality of workstations while the new message is being entered; and alerting means for alerting a trader working on the trader workstation to the incoming message detected by the monitoring means originating from the another of the plurality of workstations in a conversation with the trader workstation;

a message server for receiving incoming messages sent by sender workstations and forwarding the incoming messages to intended destination trader workstations, the server comprising:

a message log for logging the incoming messages; and means for assigning a respective reference to each incoming message;

wherein the message log logs the respective assigned reference with a respective message, wherein each reference assigned by the message server is unique.

42. A conversational dealing system for negotiated trading of instruments by traders, comprising:

a plurality of trader terminals which exchange conversational messages in a duplex messaging environment; and a message server arranged between the trader terminals, the message server receives messages from the trader terminals and sends the messages to intended recipient trader terminals, the message server comprising:

a reference generator which assigns a respective reference to an incoming message received from a sender trader terminal;

a message log which logs the incoming message with a respective assigned reference;

a message acknowledger which acknowledges the incoming message and returns the respective reference to the sending trader terminal;

a message forwarder which forwards the incoming message to an intended recipient trader terminal together with the respective assigned reference;

a comparator which compares the reference of the incoming message with the most recent reference logged at the server; and a crossover notifier which notifies one or both of the sender and receiver of the incoming message of a crossover if the references compared by the comparator are not substantially the same.

43. A system according to claim 42, wherein each of the trader terminals comprise a display which displays a crossover notification received from the message server.

44. A system according to claim 42, wherein the trader terminals comprise an icon generator which generates a crossover icon in response to a crossover notification from the server.

45. A system according to claim 44, wherein the icon indicates the context of the crossover.

46. A conversational dealing system for negotiated trading of instruments between traders, comprising:
- a plurality of trader terminals for exchange of conversational messages between traders in a duplex messaging environment; and
- a messager server arranged between the trader terminals for receiving messages from sending trader terminals and forwarding the messages to intended destinations, the message server comprising:
- means for generating a reference and assigning a respective unique reference to an incoming message received at the server from a sender trader terminal;
- means for logging the incoming message with the respective reference;
- means for acknowledging the incoming message and returning the respective assigned reference to the sender trader terminal;
- means for forwarding the incoming message and respective reference to an intended destination terminal;
- means for comparing the reference of the incoming message with the most recent reference logged at the server; and
- means for notifying at least one of the sender trader terminal and the intended destination terminal of a crossover if the references compared by the comparing means are not substantially the same.

47. A trader terminal for a conversational dealing system in which trades are negotiated by exchange of conversational messages between trader terminals in a duplex messaging environment, the trader terminal comprising:
- means for detecting the commencement of an entry of a new message into the trader terminal;
- monitoring means for monitoring for an incoming conversational message to the trader terminal received after detection of the commencement of entry of the new message;
- alerting means for alerting a trader using the trader terminal to the incoming message detected by the monitoring means and originating from a party in conversation with the trader terminal; and
- means for sending a completed message from the trader terminal;
- wherein the alerting means comprises means for inhibiting the means for sending if the incoming message has been detected; and
- wherein the means for sending comprises means for confirming, amending or canceling the new message in response to an alert from the alerting means.

48. A trader terminal according to claim 47, wherein the monitoring means further comprises means for monitoring for a further incoming message received after generation of an alert by the alerting means and prior to an attempt to resend the new message, and wherein the alerting means comprises means for generating a further alert upon detection of the further incoming message.

* * * * *